US012462743B2

(12) United States Patent
Lim et al.

(10) Patent No.: US 12,462,743 B2
(45) Date of Patent: Nov. 4, 2025

(54) DISPLAY DEVICE

(71) Applicant: Samsung Display Co., LTD., Yongin-si (KR)

(72) Inventors: Nam Jae Lim, Yongin-si (KR); Seong Jun Kim, Yongin-si (KR); Da Ye Moon, Yongin-si (KR); Kyoung Ho Lim, Yongin-si (KR); Sang Myeon Han, Yongin-si (KR)

(73) Assignee: Samsung Display Co., LTD., Gyeonggi-do (KR)

( * ) Notice: Subject to any disclaimer, the term of this patent is extended or adjusted under 35 U.S.C. 154(b) by 0 days.

(21) Appl. No.: 18/753,391

(22) Filed: Jun. 25, 2024

(65) Prior Publication Data

US 2025/0157398 A1 May 15, 2025

(30) Foreign Application Priority Data

Nov. 15, 2023 (KR) ........................ 10-2023-0158131

(51) Int. Cl.
*G09G 3/30* (2006.01)
*G09G 3/32* (2016.01)
*G09G 3/3208* (2016.01)

(52) U.S. Cl.
CPC ... *G09G 3/3208* (2013.01); *G09G 2320/0247* (2013.01); *G09G 2320/103* (2013.01); *G09G 2330/021* (2013.01); *G09G 2340/0435* (2013.01); *G09G 2360/16* (2013.01)

(58) Field of Classification Search
CPC ......... G09G 3/3208; G09G 2320/0247; G09G 2320/103; G09G 2330/021; G09G 2340/0435; G09G 2360/16
See application file for complete search history.

(56) References Cited

U.S. PATENT DOCUMENTS

| | | | | |
|---|---|---|---|---|
| 9,721,512 B2 | 8/2017 | Soni et al. | | |
| 2007/0222718 A1* | 9/2007 | Takahara | G09G 3/3233 | 345/76 |
| 2011/0148826 A1* | 6/2011 | Koyama | G06F 3/0421 | 345/204 |
| 2011/0148835 A1* | 6/2011 | Yamazaki | G09G 3/2003 | 345/207 |
| 2021/0390898 A1* | 12/2021 | Roh | G09G 3/2003 | |
| 2022/0198998 A1* | 6/2022 | Park | G09G 3/2007 | |

FOREIGN PATENT DOCUMENTS

KR 10-2023-0076912 6/2023

* cited by examiner

*Primary Examiner* — Sanghyuk Park
(74) *Attorney, Agent, or Firm* — Harness, Dickey & Pierce, P.L.C.

(57) ABSTRACT

A display device comprises pixels arranged in a display area of a display panel, and a display driver determining whether image data indicates still image characteristics or moving image characteristics and controlling a supply timing of data voltages and pixel driving control signals supplied to the pixels based on the determination result, wherein the display driver selectively adjusts a driving frequency for driving the pixels and a level of a high-potential voltage supplied to the pixels based on as result of grayscale analysis of the image data.

18 Claims, 38 Drawing Sheets

FIG. 8B

G

| | | | | | | | | | | | | | | | |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 15 | 24 | 4 | 21 | 23 | 0 | 0 | 0 | 0 | 0 | 0 |
| 0 | 0 | 0 | 0 | 0 | 10 | 26 | 2 | 34 | 26 | 0 | 0 | 0 | 0 | 0 | 0 |
| 0 | 0 | 0 | 0 | 0 | 1 | 9 | 3 | 2 | 6 | 0 | 0 | 0 | 0 | 0 | 0 |
| 0 | 0 | 0 | 0 | 0 | 0 | 0 | 9 | 4 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 22 | 30 | 36 | 52 | 32 | 2 | 0 | 0 | 0 | 0 | 0 |
| 0 | 0 | 0 | 0 | 0 | 11 | 16 | 20 | 27 | 18 | 1 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 6 | 11 | 0 | 1 | 2 | 0 | 0 | 0 | 0 | 0 | 0 |
| 0 | 0 | 0 | 0 | 0 | 6 | 35 | 16 | 7 | 10 | 0 | 0 | 0 | 0 | 0 | 0 |
| 0 | 0 | 0 | 0 | 0 | 7 | 12 | 7 | 2 | 12 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

FIG. 9A

R

| | | | | | | | | | | | | | | | |
|---|---|---|---|---|---|---|---|---|---|---|---|---|---|---|---|
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |

FIG. 9B

| | | | | | | | | | | | | | | | |
|---|---|---|---|---|---|---|---|---|---|---|---|---|---|---|---|
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |

G

FIG. 9C

| | | | | | | | | | | | | | | | |
|---|---|---|---|---|---|---|---|---|---|---|---|---|---|---|---|
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |

B

FIG. 9D

| | | | | | | | | | | | | | | | |
|---|---|---|---|---|---|---|---|---|---|---|---|---|---|---|---|
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |

Y

FIG. 12A

R

| | | | | | | | | | | | | | | | |
|---|---|---|---|---|---|---|---|---|---|---|---|---|---|---|---|
| 19 | 21 | 22 | 28 | 24 | 22 | 26 | 29 | 24 | 23 | 23 | 23 | 25 | 32 | 32 | 24 |
| 19 | 6 | 5 | 28 | 17 | 13 | 51 | 38 | 30 | 38 | 40 | 57 | 34 | 116 | 122 | 64 |
| 23 | 18 | 8 | 20 | 32 | 30 | 19 | 13 | 30 | 30 | 29 | 55 | 15 | 89 | 115 | 49 |
| 18 | 26 | 26 | 22 | 28 | 32 | 21 | 28 | 23 | 27 | 7 | 11 | 11 | 43 | 57 | 19 |
| 25 | 17 | 23 | 17 | 32 | 47 | 30 | 32 | 29 | 38 | 7 | 8 | 9 | 8 | 9 | 14 |
| 28 | 37 | 19 | 8 | 7 | 13 | 31 | 14 | 24 | 24 | 43 | 26 | 11 | 6 | 9 | 38 |
| 27 | 17 | 13 | 5 | 5 | 7 | 34 | 22 | 12 | 26 | 27 | 28 | 8 | 26 | 85 | 59 |
| 37 | 29 | 60 | 6 | 18 | 74 | 31 | 18 | 29 | 13 | 29 | 28 | 15 | 88 | 103 | 50 |
| 13 | 13 | 39 | 6 | 39 | 119 | 60 | 21 | 12 | 11 | 31 | 24 | 58 | 74 | 55 | 30 |
| 14 | 8 | 6 | 4 | 31 | 116 | 67 | 17 | 10 | 21 | 54 | 46 | 81 | 49 | 10 | 13 |
| 36 | 44 | 5 | 6 | 17 | 82 | 56 | 54 | 56 | 74 | 66 | 50 | 37 | 26 | 3 | 13 |
| 24 | 42 | 11 | 6 | 8 | 36 | 51 | 35 | 50 | 21 | 18 | 17 | 7 | 4 | 5 | 12 |
| 14 | 16 | 8 | 7 | 5 | 17 | 7 | 18 | 15 | 7 | 7 | 4 | 4 | 3 | 4 | 12 |
| 14 | 10 | 9 | 5 | 5 | 6 | 3 | 6 | 8 | 5 | 8 | 9 | 10 | 13 | 8 | 14 |
| 12 | 2 | 2 | 5 | 5 | 5 | 4 | 11 | 7 | 8 | 7 | 7 | 17 | 10 | 17 | 16 |
| 12 | 2 | 2 | 5 | 7 | 4 | 5 | 8 | 10 | 6 | 6 | 4 | 4 | 5 | 7 | 15 |
| 12 | 2 | 2 | 4 | 4 | 4 | 4 | 13 | 12 | 6 | 7 | 9 | 3 | 9 | 10 | 15 |
| 19 | 21 | 21 | 21 | 21 | 21 | 21 | 21 | 22 | 21 | 22 | 21 | 22 | 23 | 24 | 21 |

FIG. 12B

G

| | | | | | | | | | | | | | | | |
|---|---|---|---|---|---|---|---|---|---|---|---|---|---|---|---|
| 20 | 22 | 22 | 26 | 24 | 23 | 27 | 30 | 26 | 24 | 24 | 26 | 26 | 29 | 30 | 23 |
| 32 | 13 | 14 | 32 | 28 | 35 | 62 | 50 | 48 | 55 | 49 | 72 | 49 | 93 | 75 | 57 |
| 39 | 40 | 24 | 36 | 60 | 54 | 32 | 32 | 50 | 49 | 44 | 75 | 35 | 89 | 94 | 50 |
| 32 | 45 | 61 | 37 | 56 | 45 | 40 | 51 | 47 | 44 | 26 | 39 | 32 | 59 | 65 | 29 |
| 41 | 44 | 53 | 31 | 47 | 55 | 50 | 54 | 57 | 64 | 26 | 30 | 26 | 32 | 24 | 23 |
| 43 | 71 | 43 | 14 | 14 | 26 | 61 | 35 | 54 | 51 | 58 | 44 | 27 | 30 | 26 | 41 |
| 34 | 34 | 22 | 7 | 15 | 24 | 63 | 49 | 27 | 38 | 43 | 49 | 26 | 49 | 90 | 62 |
| 43 | 41 | 56 | 6 | 33 | 82 | 60 | 53 | 45 | 30 | 51 | 52 | 29 | 93 | 103 | 55 |
| 18 | 27 | 40 | 6 | 52 | 113 | 70 | 36 | 25 | 25 | 53 | 45 | 60 | 78 | 63 | 31 |
| 18 | 16 | 11 | 5 | 43 | 113 | 76 | 32 | 27 | 35 | 66 | 59 | 83 | 58 | 13 | 13 |
| 37 | 57 | 10 | 5 | 26 | 96 | 69 | 67 | 65 | 81 | 85 | 68 | 48 | 32 | 2 | 12 |
| 30 | 63 | 19 | 5 | 12 | 56 | 68 | 55 | 57 | 31 | 24 | 23 | 7 | 4 | 11 | 15 |
| 19 | 34 | 17 | 5 | 5 | 32 | 23 | 30 | 25 | 12 | 9 | 6 | 7 | 10 | 16 | 15 |
| 17 | 19 | 15 | 4 | 5 | 7 | 8 | 9 | 15 | 12 | 12 | 15 | 16 | 21 | 18 | 15 |
| 12 | 2 | 2 | 4 | 4 | 5 | 4 | 17 | 19 | 25 | 15 | 14 | 22 | 13 | 21 | 18 |
| 12 | 2 | 2 | 4 | 5 | 4 | 8 | 15 | 19 | 15 | 16 | 8 | 8 | 15 | 16 | 20 |
| 12 | 3 | 2 | 4 | 4 | 4 | 4 | 13 | 25 | 11 | 7 | 14 | 6 | 15 | 11 | 17 |
| 19 | 21 | 21 | 21 | 21 | 21 | 21 | 21 | 22 | 22 | 22 | 22 | 22 | 23 | 24 | 20 |

FIG. 12C

B

| | | | | | | | | | | | | | | | |
|---|---|---|---|---|---|---|---|---|---|---|---|---|---|---|---|
| 21 | 24 | 25 | 23 | 24 | 26 | 26 | 28 | 27 | 26 | 25 | 26 | 26 | 23 | 23 | 20 |
| 45 | 38 | 45 | 33 | 46 | 57 | 45 | 47 | 61 | 61 | 42 | 57 | 51 | 23 | 9 | 21 |
| 51 | 56 | 51 | 46 | 67 | 56 | 43 | 57 | 59 | 61 | 53 | 61 | 58 | 38 | 22 | 25 |
| 45 | 70 | 76 | 36 | 66 | 41 | 51 | 65 | 62 | 60 | 61 | 70 | 60 | 54 | 36 | 41 |
| 47 | 64 | 64 | 32 | 45 | 40 | 59 | 62 | 71 | 73 | 56 | 64 | 54 | 69 | 54 | 41 |
| 46 | 77 | 53 | 21 | 28 | 42 | 72 | 57 | 73 | 67 | 56 | 57 | 49 | 68 | 55 | 30 |
| 38 | 55 | 29 | 11 | 34 | 53 | 72 | 63 | 44 | 43 | 56 | 63 | 57 | 60 | 40 | 34 |
| 39 | 50 | 20 | 7 | 45 | 61 | 74 | 75 | 47 | 53 | 66 | 68 | 52 | 42 | 43 | 31 |
| 36 | 54 | 20 | 7 | 56 | 63 | 66 | 49 | 47 | 46 | 63 | 58 | 38 | 35 | 31 | 21 |
| 28 | 38 | 25 | 6 | 50 | 69 | 66 | 54 | 52 | 45 | 52 | 49 | 32 | 35 | 15 | 13 |
| 25 | 42 | 23 | 5 | 36 | 81 | 55 | 52 | 45 | 45 | 59 | 53 | 35 | 20 | 5 | 13 |
| 36 | 51 | 21 | 4 | 18 | 52 | 55 | 57 | 38 | 35 | 23 | 29 | 9 | 10 | 24 | 21 |
| 30 | 50 | 27 | 4 | 8 | 36 | 48 | 42 | 35 | 24 | 16 | 13 | 17 | 23 | 34 | 23 |
| 22 | 31 | 19 | 4 | 5 | 12 | 21 | 17 | 27 | 26 | 22 | 23 | 20 | 26 | 28 | 17 |
| 13 | 5 | 3 | 4 | 4 | 4 | 6 | 22 | 31 | 43 | 26 | 19 | 17 | 12 | 13 | 17 |
| 12 | 4 | 3 | 4 | 5 | 4 | 11 | 22 | 22 | 21 | 29 | 12 | 12 | 20 | 20 | 20 |
| 13 | 5 | 3 | 4 | 4 | 4 | 7 | 11 | 30 | 17 | 8 | 19 | 10 | 16 | 11 | 17 |
| 19 | 21 | 21 | 21 | 21 | 21 | 21 | 21 | 23 | 22 | 21 | 22 | 22 | 24 | 24 | 21 |

FIG. 13A

R

| | | | | | | | | | | | | | | | |
|---|---|---|---|---|---|---|---|---|---|---|---|---|---|---|---|
| 10 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 10 | 10 | 30 | 0.1 | 10 | 10 | 0.1 | 0.1 | 0.1 | 0.1 | 0.1 | 0.1 | 0.1 | 0.1 | 0.1 | 0.1 |
| 0.1 | 10 | 10 | 10 | 0.1 | 0.1 | 10 | 10 | 0.1 | 0.1 | 0.1 | 0.1 | 10 | 0.1 | 0.1 | 0.1 |
| 10 | 0.1 | 0.1 | 0.1 | 0.1 | 0.1 | 0.1 | 0.1 | 0.1 | 0.1 | 10 | 10 | 10 | 0.1 | 0.1 | 10 |
| 0.1 | 10 | 0.1 | 10 | 0.1 | 0.1 | 0.1 | 0.1 | 0.1 | 0.1 | 10 | 10 | 10 | 10 | 10 | 10 |
| 0.1 | 0.1 | 10 | 10 | 10 | 10 | 0.1 | 10 | 0.1 | 0.1 | 0.1 | 0.1 | 10 | 10 | 10 | 0.1 |
| 0.1 | 10 | 10 | 30 | 30 | 10 | 0.1 | 0.1 | 10 | 0.1 | 0.1 | 0.1 | 10 | 0.1 | 0.1 | 0.1 |
| 0.1 | 0.1 | 0.1 | 10 | 10 | 0.1 | 0.1 | 10 | 0.1 | 10 | 0.1 | 0.1 | 10 | 0.1 | 0.1 | 0.1 |
| 10 | 10 | 0.1 | 10 | 0.1 | 0.1 | 0.1 | 0.1 | 10 | 10 | 0.1 | 0.1 | 0.1 | 0.1 | 0.1 | 0.1 |
| 10 | 10 | 10 | 30 | 0.1 | 0.1 | 0.1 | 10 | 10 | 0.1 | 0.1 | 0.1 | 0.1 | 0.1 | 10 | 10 |
| 0.1 | 0.1 | 30 | 10 | 10 | 0.1 | 0.1 | 0.1 | 0.1 | 0.1 | 0.1 | 0.1 | 0.1 | 0.1 | 30 | 10 |
| 0.1 | 0.1 | 10 | 10 | 10 | 0.1 | 0.1 | 0.1 | 0.1 | 0.1 | 10 | 10 | 10 | 30 | 30 | 10 |
| 10 | 10 | 10 | 10 | 30 | 10 | 10 | 10 | 10 | 10 | 10 | 30 | 30 | 30 | 30 | 10 |
| 10 | 10 | 10 | 30 | 30 | 10 | 30 | 10 | 10 | 30 | 10 | 10 | 10 | 10 | 10 | 10 |
| 10 | 30 | 30 | 30 | 30 | 30 | 30 | 10 | 10 | 10 | 10 | 10 | 10 | 10 | 10 | 10 |
| 10 | 30 | 30 | 30 | 10 | 30 | 30 | 10 | 10 | 10 | 10 | 30 | 30 | 30 | 10 | 10 |
| 10 | 30 | 30 | 30 | 30 | 30 | 30 | 10 | 10 | 10 | 10 | 10 | 30 | 10 | 10 | 10 |
| 10 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |

FIG. 13B

G

| | | | | | | | | | | | | | | | |
|---|---|---|---|---|---|---|---|---|---|---|---|---|---|---|---|
| 10 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 10 | 10 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 10 | 10 | 0.1 | 0.1 | 0.1 | 0.1 | 0.1 | 0.1 | 0.1 | 0.1 | 0.1 | 0.1 | 0.1 |
| 0.1 | 0.1 | 0.1 | 10 | 10 | 0.1 | 0.1 | 0.1 | 0.1 | 0.1 | 0.1 | 0.1 | 0.1 | 0.1 | 0.1 | 0.1 |
| 0.1 | 0.1 | 0.1 | 10 | 0.1 | 0.1 | 0.1 | 0.1 | 0.1 | 0.1 | 0.1 | 0.1 | 0.1 | 0.1 | 0.1 | 0.1 |
| 10 | 0.1 | 0.1 | 10 | 0.1 | 0.1 | 0.1 | 0.1 | 0.1 | 0.1 | 0.1 | 0.1 | 0.1 | 0.1 | 0.1 | 0.1 |
| 10 | 10 | 10 | 30 | 0.1 | 0.1 | 0.1 | 0.1 | 0.1 | 0.1 | 0.1 | 0.1 | 0.1 | 0.1 | 10 | 10 |
| 0.1 | 0.1 | 10 | 30 | 0.1 | 0.1 | 0.1 | 0.1 | 0.1 | 0.1 | 0.1 | 0.1 | 0.1 | 0.1 | 30 | 10 |
| 0.1 | 0.1 | 10 | 30 | 10 | 0.1 | 0.1 | 0.1 | 0.1 | 0.1 | 0.1 | 0.1 | 10 | 30 | 10 | 10 |
| 10 | 0.1 | 10 | 30 | 30 | 0.1 | 0.1 | 0.1 | 0.1 | 10 | 10 | 10 | 10 | 10 | 10 | 10 |
| 10 | 10 | 10 | 30 | 30 | 10 | 10 | 10 | 10 | 10 | 10 | 10 | 10 | 0.1 | 10 | 10 |
| 10 | 30 | 30 | 30 | 30 | 30 | 30 | 10 | 10 | 0.1 | 10 | 10 | 0.1 | 10 | 0.1 | 10 |
| 10 | 30 | 30 | 30 | 30 | 30 | 10 | 10 | 10 | 10 | 10 | 10 | 10 | 10 | 10 | 10 |
| 10 | 30 | 30 | 30 | 30 | 30 | 30 | 10 | 0.1 | 10 | 10 | 10 | 10 | 10 | 10 | 10 |
| 10 | 0.1 | 0.1 | 0.1 | 0.1 | 0.1 | 0.1 | 0.1 | 0.1 | 0.1 | 0.1 | 0.1 | 0.1 | 0.1 | 0.1 | 10 |

FIG. 13C

| | | | | | | | | | | | | | | | |
|---|---|---|---|---|---|---|---|---|---|---|---|---|---|---|---|
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 10 |
| 0.1 | 0.1 | 0.1 | 0.1 | 0.1 | 0.1 | 0.1 | 0.1 | 0.1 | 0.1 | 0.1 | 0.1 | 0.1 | 0.1 | 10 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 10 | 0.1 | 0.1 | 0.1 | 0.1 | 0.1 | 0.1 | 0.1 | 0.1 | 0.1 | 0.1 | 0.1 | 0.1 |
| 0.1 | 0.1 | 10 | 10 | 0.1 | 0.1 | 0.1 | 0.1 | 0.1 | 0.1 | 0.1 | 0.1 | 0.1 | 0.1 | 0.1 | 0.1 |
| 0.1 | 0.1 | 10 | 10 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 10 | 0.1 | 0.1 | 0.1 | 0.1 | 0.1 | 0.1 | 0.1 | 0.1 | 0.1 | 0.1 | 10 | 10 |
| 0.1 | 0.1 | 0.1 | 30 | 0.1 | 0.1 | 0.1 | 0.1 | 0.1 | 0.1 | 0.1 | 0.1 | 0.1 | 10 | 30 | 10 |
| 0.1 | 0.1 | 0.1 | 30 | 10 | 0.1 | 0.1 | 0.1 | 0.1 | 0.1 | 0.1 | 0.1 | 10 | 10 | 0.1 | 0.1 |
| 0.1 | 0.1 | 0.1 | 30 | 10 | 0.1 | 0.1 | 0.1 | 0.1 | 0.1 | 10 | 10 | 10 | 0.1 | 0.1 | 0.1 |
| 0.1 | 0.1 | 10 | 30 | 30 | 10 | 0.1 | 10 | 0.1 | 0.1 | 0.1 | 0.1 | 10 | 0.1 | 0.1 | 10 |
| 10 | 30 | 30 | 30 | 30 | 30 | 10 | 0.1 | 0.1 | 0.1 | 0.1 | 10 | 10 | 10 | 10 | 10 |
| 10 | 30 | 30 | 30 | 30 | 30 | 10 | 0.1 | 0.1 | 0.1 | 0.1 | 10 | 10 | 10 | 10 | 10 |
| 10 | 30 | 30 | 30 | 30 | 30 | 10 | 10 | 0.1 | 10 | 10 | 10 | 10 | 10 | 10 | 10 |
| 10 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |

B

FIG. 13D

Y

| | | | | | | | | | | | | | | | |
|---|---|---|---|---|---|---|---|---|---|---|---|---|---|---|---|
| 9.01 | 0.1 | 0.1 | 0.1 | 0.1 | 0.1 | 0.1 | 0.1 | 0.1 | 0.1 | 0.1 | 0.1 | 0.1 | 0.1 | 0.1 | 1.09 |
| 2.08 | 9.01 | 13.01 | 0.1 | 2.08 | 2.08 | 0.1 | 0.1 | 0.1 | 0.1 | 0.1 | 0.1 | 0.1 | 0.1 | 1.09 | 0.1 |
| 0.1 | 2.08 | 2.08 | 2.08 | 0.1 | 0.1 | 2.08 | 2.08 | 0.1 | 0.1 | 0.1 | 0.1 | 2.08 | 0.1 | 0.1 | 0.1 |
| 2.08 | 0.1 | 0.1 | 0.1 | 0.1 | 0.1 | 0.1 | 0.1 | 0.1 | 0.1 | 2.08 | 2.08 | 2.08 | 0.1 | 0.1 | 2.08 |
| 0.1 | 2.08 | 0.1 | 2.08 | 0.1 | 0.1 | 0.1 | 0.1 | 0.1 | 0.1 | 2.08 | 2.08 | 2.08 | 2.08 | 2.08 | 2.08 |
| 0.1 | 0.1 | 2.08 | 9.01 | 9.01 | 2.08 | 0.1 | 2.08 | 0.1 | 0.1 | 0.1 | 0.1 | 2.08 | 2.08 | 2.08 | 0.1 |
| 0.1 | 2.08 | 2.08 | 14 | 13.01 | 2.08 | 0.1 | 0.1 | 2.08 | 0.1 | 0.1 | 0.1 | 2.08 | 0.1 | 0.1 | 0.1 |
| 0.1 | 0.1 | 1.09 | 10 | 2.08 | 0.1 | 0.1 | 2.08 | 0.1 | 2.08 | 0.1 | 0.1 | 2.08 | 0.1 | 0.1 | 0.1 |
| 9.01 | 2.08 | 1.09 | 10 | 0.1 | 0.1 | 0.1 | 0.1 | 2.08 | 2.08 | 0.1 | 0.1 | 0.1 | 0.1 | 0.1 | 0.1 |
| 9.01 | 9.01 | 9.01 | 28 | 0.1 | 0.1 | 0.1 | 2.08 | 2.08 | 0.1 | 0.1 | 0.1 | 0.1 | 0.1 | 10 | 10 |
| 0.1 | 0.1 | 13.01 | 26 | 2.08 | 0.1 | 0.1 | 0.1 | 0.1 | 0.1 | 0.1 | 0.1 | 0.1 | 1.09 | 30 | 10 |
| 0.1 | 0.1 | 9.01 | 26 | 10 | 0.1 | 0.1 | 0.1 | 0.1 | 0.1 | 2.08 | 2.08 | 10 | 28 | 13.01 | 9.01 |
| 9.01 | 2.08 | 9.01 | 26 | 28 | 2.08 | 2.08 | 2.08 | 2.08 | 9.01 | 10 | 14 | 14 | 13.01 | 13.01 | 9.01 |
| 9.01 | 9.01 | 10 | 30 | 30 | 10 | 13.01 | 10 | 9.01 | 13.01 | 9.01 | 9.01 | 10 | 2.08 | 9.01 | 10 |
| 10 | 30 | 30 | 30 | 30 | 30 | 28 | 9.01 | 9.01 | 2.08 | 9.01 | 10 | 3.07 | 10 | 3.07 | 10 |
| 10 | 30 | 30 | 30 | 26 | 30 | 14 | 9.01 | 9.01 | 9.01 | 9.01 | 14 | 14 | 14 | 10 | 10 |
| 10 | 30 | 30 | 30 | 30 | 30 | 28 | 10 | 2.08 | 10 | 10 | 10 | 14 | 10 | 10 | 10 |
| 10 | 0.1 | 0.1 | 0.1 | 0.1 | 0.1 | 0.1 | 0.1 | 0.1 | 0.1 | 0.1 | 0.1 | 0.1 | 0.1 | 0.1 | 7.03 |

FIG. 16A

R

| | | | | | | | | | | | | | | | |
|---|---|---|---|---|---|---|---|---|---|---|---|---|---|---|---|
| 121 | 121 | 118 | 116 | 121 | 124 | 127 | 124 | 122 | 118 | 124 | 120 | 112 | 116 | 114 | 113 |
| 126 | 124 | 123 | 124 | 121 | 125 | 128 | 127 | 123 | 125 | 119 | 122 | 117 | 116 | 113 | 113 |
| 128 | 129 | 128 | 128 | 122 | 124 | 125 | 125 | 126 | 125 | 122 | 122 | 124 | 124 | 127 | 125 |
| 129 | 130 | 129 | 131 | 130 | 128 | 124 | 118 | 128 | 127 | 127 | 129 | 129 | 126 | 125 | 124 |
| 93 | 127 | 131 | 132 | 132 | 132 | 108 | 102 | 115 | 119 | 112 | 125 | 119 | 127 | 130 | 129 |
| 72 | 80 | 101 | 116 | 124 | 125 | 96 | 95 | 87 | 82 | 72 | 84 | 69 | 66 | 90 | 84 |
| 64 | 74 | 86 | 86 | 80 | 67 | 53 | 78 | 79 | 80 | 50 | 80 | 76 | 42 | 56 | 64 |
| 73 | 90 | 91 | 96 | 92 | 81 | 78 | 91 | 103 | 103 | 84 | 81 | 72 | 88 | 97 | 104 |
| 85 | 109 | 118 | 94 | 105 | 107 | 87 | 96 | 99 | 97 | 73 | 101 | 102 | 105 | 104 | 118 |
| 114 | 117 | 115 | 78 | 81 | 124 | 107 | 96 | 91 | 108 | 104 | 110 | 115 | 91 | 66 | 66 |
| 108 | 109 | 108 | 76 | 58 | 107 | 107 | 105 | 107 | 112 | 114 | 115 | 114 | 82 | 65 | 96 |
| 79 | 101 | 102 | 43 | 32 | 64 | 109 | 107 | 110 | 110 | 109 | 109 | 110 | 73 | 82 | 94 |
| 48 | 44 | 48 | 27 | 27 | 40 | 58 | 58 | 58 | 55 | 58 | 57 | 57 | 57 | 49 | 53 |
| 68 | 67 | 73 | 53 | 27 | 79 | 79 | 87 | 90 | 85 | 81 | 87 | 82 | 63 | 68 | 74 |
| 47 | 69 | 79 | 40 | 22 | 85 | 75 | 87 | 85 | 84 | 81 | 84 | 82 | 62 | 65 | 67 |
| 66 | 50 | 68 | 46 | 21 | 68 | 70 | 77 | 80 | 79 | 75 | 78 | 75 | 59 | 63 | 65 |
| 67 | 38 | 47 | 32 | 21 | 57 | 59 | 65 | 66 | 66 | 65 | 73 | 72 | 55 | 60 | 65 |
| 71 | 43 | 51 | 43 | 42 | 64 | 58 | 65 | 64 | 64 | 62 | 71 | 71 | 49 | 60 | 57 |

FIG. 16B

G

| | | | | | | | | | | | | | | | |
|---|---|---|---|---|---|---|---|---|---|---|---|---|---|---|---|
| 117 | 116 | 116 | 116 | 118 | 120 | 121 | 120 | 120 | 118 | 123 | 120 | 117 | 121 | 119 | 118 |
| 120 | 119 | 119 | 121 | 119 | 121 | 122 | 122 | 120 | 121 | 119 | 122 | 118 | 119 | 116 | 115 |
| 123 | 123 | 122 | 123 | 122 | 122 | 121 | 121 | 121 | 121 | 119 | 122 | 122 | 120 | 122 | 119 |
| 124 | 123 | 123 | 126 | 125 | 125 | 120 | 113 | 123 | 122 | 122 | 123 | 124 | 120 | 120 | 121 |
| 95 | 121 | 126 | 126 | 127 | 127 | 104 | 94 | 107 | 112 | 107 | 120 | 114 | 121 | 123 | 124 |
| 71 | 80 | 99 | 113 | 120 | 119 | 93 | 87 | 83 | 77 | 70 | 83 | 69 | 66 | 88 | 85 |
| 67 | 70 | 83 | 84 | 80 | 66 | 55 | 71 | 70 | 72 | 51 | 78 | 76 | 47 | 59 | 67 |
| 69 | 85 | 87 | 92 | 89 | 80 | 76 | 83 | 87 | 88 | 74 | 76 | 71 | 84 | 91 | 104 |
| 77 | 104 | 114 | 69 | 52 | 101 | 85 | 85 | 83 | 86 | 64 | 95 | 96 | 100 | 101 | 118 |
| 117 | 117 | 114 | 73 | 64 | 120 | 101 | 87 | 82 | 102 | 101 | 109 | 113 | 86 | 65 | 65 |
| 112 | 112 | 112 | 78 | 61 | 105 | 104 | 98 | 105 | 111 | 113 | 112 | 113 | 78 | 66 | 99 |
| 80 | 104 | 105 | 46 | 39 | 69 | 106 | 105 | 109 | 108 | 108 | 106 | 104 | 69 | 85 | 96 |
| 50 | 47 | 49 | 30 | 34 | 43 | 58 | 60 | 63 | 58 | 60 | 60 | 58 | 57 | 50 | 51 |
| 76 | 73 | 79 | 61 | 35 | 79 | 81 | 91 | 95 | 89 | 86 | 92 | 88 | 69 | 74 | 76 |
| 81 | 76 | 79 | 47 | 31 | 84 | 79 | 91 | 93 | 90 | 87 | 90 | 90 | 68 | 69 | 72 |
| 75 | 55 | 70 | 53 | 32 | 74 | 78 | 85 | 89 | 86 | 84 | 87 | 87 | 62 | 67 | 71 |
| 72 | 42 | 46 | 41 | 34 | 69 | 72 | 78 | 81 | 78 | 78 | 84 | 83 | 56 | 66 | 70 |
| 71 | 46 | 54 | 47 | 52 | 76 | 72 | 79 | 79 | 77 | 76 | 83 | 83 | 51 | 65 | 60 |

FIG. 16C

| | | | | | | | | | | | | | | | | |
|---|---|---|---|---|---|---|---|---|---|---|---|---|---|---|---|---|
| | 85 | 85 | 85 | 86 | 88 | 88 | 90 | 90 | 90 | 90 | 91 | 91 | 92 | 93 | 92 | 90 |
| | 86 | 85 | 87 | 90 | 88 | 89 | 91 | 90 | 88 | 91 | 90 | 91 | 88 | 89 | 89 | 85 |
| | 87 | 87 | 90 | 91 | 90 | 90 | 89 | 89 | 89 | 89 | 88 | 91 | 90 | 87 | 89 | 83 |
| | 87 | 87 | 90 | 93 | 93 | 93 | 88 | 79 | 91 | 90 | 90 | 91 | 91 | 89 | 88 | 87 |
| | 64 | 86 | 92 | 94 | 95 | 95 | 73 | 56 | 72 | 79 | 76 | 89 | 83 | 90 | 92 | 92 |
| | 33 | 46 | 68 | 82 | 89 | 88 | 63 | 47 | 51 | 44 | 34 | 53 | 41 | 35 | 60 | 64 |
| | 34 | 34 | 47 | 49 | 50 | 35 | 28 | 32 | 34 | 37 | 26 | 48 | 51 | 26 | 36 | 43 |
| | 41 | 52 | 54 | 59 | 57 | 52 | 42 | 43 | 40 | 42 | 40 | 47 | 48 | 54 | 59 | 77 |
| | 48 | 73 | 83 | 49 | 33 | 69 | 60 | 50 | 45 | 52 | 39 | 67 | 66 | 69 | 73 | 87 |
| B | 90 | 90 | 88 | 52 | 42 | 88 | 72 | 53 | 49 | 71 | 73 | 81 | 84 | 61 | 47 | 46 |
| | 87 | 89 | 89 | 59 | 48 | 78 | 75 | 67 | 77 | 81 | 86 | 84 | 85 | 54 | 50 | 74 |
| | 60 | 81 | 83 | 34 | 34 | 57 | 82 | 79 | 82 | 82 | 82 | 77 | 73 | 47 | 64 | 72 |
| | 36 | 34 | 37 | 23 | 30 | 33 | 41 | 44 | 48 | 43 | 44 | 46 | 41 | 39 | 34 | 32 |
| | 59 | 56 | 61 | 51 | 32 | 61 | 63 | 71 | 75 | 69 | 68 | 71 | 63 | 50 | 55 | 56 |
| | 62 | 57 | 56 | 35 | 25 | 63 | 62 | 72 | 73 | 70 | 69 | 71 | 71 | 50 | 50 | 51 |
| | 58 | 40 | 43 | 37 | 27 | 59 | 63 | 68 | 73 | 69 | 67 | 68 | 69 | 44 | 49 | 52 |
| | 46 | 27 | 29 | 33 | 30 | 57 | 60 | 64 | 67 | 65 | 63 | 68 | 67 | 40 | 48 | 50 |
| | 48 | 30 | 38 | 32 | 43 | 62 | 59 | 65 | 67 | 64 | 62 | 69 | 68 | 36 | 49 | 42 |

FIG. 17A

| | | | | | | | | | | | | | | | |
|---|---|---|---|---|---|---|---|---|---|---|---|---|---|---|---|
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |

R

FIG. 17B

| | | | | | | | | | | | | | | | |
|---|---|---|---|---|---|---|---|---|---|---|---|---|---|---|---|
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |

G

FIG. 17C

| | | | | | | | | | | | | | | | |
|---|---|---|---|---|---|---|---|---|---|---|---|---|---|---|---|
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |

B

FIG. 17D

Load

| | | | | | | | | | | | | | | | |
|---|---|---|---|---|---|---|---|---|---|---|---|---|---|---|---|
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |

DISPLAY DEVICE

CROSS-REFERENCE TO RELATED APPLICATION(S)

This application claims priority to and the benefit of Korean Patent Application No. 10-2023-0158131 under 35 U.S.C. § 119, filed on Nov. 15, 2023, in the Korean Intellectual Property Office (KIPO), the disclosure of which is incorporated herein in its entirety by reference.

BACKGROUND

1. Technical Field

The disclosure relates to a display device.

2. Description of the Related Art

As the information society develops, demands for display devices for displaying images are increasing in various forms. For example, display devices are applied to various electronic devices such as smartphones, digital cameras, notebook computers, navigation devices, and smart televisions.

The display devices may be flat panel display devices such as liquid crystal display devices, field emission display devices, and light emitting display devices. The light emitting display devices may include an organic light emitting display device including an organic light emitting element and an inorganic light emitting display device including an inorganic light emitting element such as quantum dots.

In particular, the development of display devices including quantum dots is progressing further, and continuous efforts are being made to improve the image display efficiency and power reduction efficiency of the quantum dot display devices. For example, a method of changing a driving frequency of a quantum dot display device by lowering the driving frequency of the quantum dot display device from a high frequency to a low frequency or increasing the driving frequency of the quantum dot display device from a low frequency to a high frequency in order to reduce the power consumption of the quantum dot display device is being developed.

SUMMARY

Aspects of the disclosure provide a display device which can improve power consumption reduction efficiency and product reliability by preventing image display defects due to low-frequency driving.

Aspects of the disclosure also provide a display device which can efficiently adjust an optimal driving frequency, image display and maintenance period, and high-potential driving voltage level according to the results of analysis of the characteristics of a displayed image.

However, aspects of the disclosure are not restricted to the one set forth herein. The above and other aspects of the disclosure will become more apparent to one of ordinary skill in the art to which the disclosure pertains by referencing the detailed description of the disclosure given below.

According to an aspect of the disclosure, there is provided a display device comprising pixels arranged in a display area of a display panel, and a display driver determining whether image data indicates still image characteristics or moving image characteristics and controlling a supply timing of data voltages and pixel driving control signals supplied to the pixels based on a determination result, wherein the display driver selectively adjusts a driving frequency for driving the pixels and a level of a high-potential voltage supplied to the pixels based on a result of grayscale analysis of the image data.

In an embodiment, the display driver may determine whether a still image is displayed according to the result of grayscale analysis of the image data and, in case of determining that the still image is displayed, drives the pixels by lowering the driving frequency of pixels of each preset block or all the pixels and the level of the high-potential voltage supplied to the pixels and increasing an image display period during which the data voltages are supplied to the pixels according to the result of grayscale analysis of the image data.

In an embodiment, the display driver may determine whether a moving image is displayed according to the result of grayscale analysis of the image data and, in case of determining that the moving image is displayed, may drive the pixels by increasing the driving frequency of the pixels of each preset block or all the pixels and the level of the high-potential voltage supplied to the pixels and reducing the image display period during which the data voltages are supplied to the pixels according to the result of grayscale analysis of the image data.

In an embodiment, the display driver may comprise a maximum luminance detection part sorting an image data input from an outside in units of at least one frame and detecting minimum and maximum grayscale values and minimum and maximum luminance values of image data of at least one frame; a load detection part comparing and analyzing grayscale values or luminance values of the image data of at least one frame and detecting load information of pixels of each preset image display block and load information of all the pixels of at least one frame; an image analysis part analyzing the grayscale values and the luminance values of the image data of at least one frame using a histogram and detecting grayscale distribution information of each preset image display block and grayscale distribution information of at least one frame; and a driving frequency setting part varying and setting the driving frequency of the pixels of at least one frame in units of at least one frame period according to ranges comprising the minimum and maximum grayscale values and the minimum and maximum luminance values of the image data of at least one frame.

In an embodiment, the display driver may further comprise a load scale setting part analyzing a grayscale display range and a luminance display range of image data of each preset image display block or at least one frame according to the ranges comprising the minimum and maximum grayscale values and the minimum and maximum luminance values of the image data of at least one frame, and the driving frequency setting part may vary and set the driving frequency of the pixels of at least one frame in units of at least one frame period according to the grayscale display range and the luminance display range of the image data of each preset image display block or at least one frame.

In an embodiment, the display driver may further comprise a block driving frequency setting part varying and setting the driving frequency of the pixels of each preset image display block in units of at least one frame period according to the grayscale distribution information of each preset image display block and the grayscale distribution information of at least one frame; a driving voltage setting part varying and setting the level of the high-potential voltage supplied to the pixels in units of at least one frame period according to the ranges comprising the minimum and maximum grayscale values and the minimum and maximum luminance values of the image data of at least one frame; an image display period setting part varying and setting a supply period of an image data voltage supplied to the pixels of at least one frame in response to a change in the driving frequency of the pixels of at least one frame which is varied and set in units of at least one frame period; and a panel driving control part varying a supply timing and a supply period of the pixel driving control signals and the data voltages supplied to the pixels in response to a change in the driving frequency which is varied and set in units of at least one frame period.

In an embodiment, the driving voltage setting part may vary and set the level of the high-potential voltage supplied to the pixels of each preset image display block according to ranges comprising minimum and maximum grayscale values and minimum and maximum luminance values of the image data of each preset image display block.

In an embodiment, the image display period setting part may vary and set the supply period of an image data voltage supplied to the pixels of each preset image display block in units of a preset image display block in response to a change in the driving frequency of the pixels of each preset image display block which is varied and set in units of at least one frame period.

In an embodiment, the panel driving control part may vary the supply timing and supply period of the pixel driving control signals and the data voltages sequentially supplied to the pixels of each preset image display block in response to a change in the driving frequency of the pixels of each preset image display block which is varied and set in units of at least one frame period.

In an embodiment, the panel driving control part may vary the level of the high-potential voltage supplied to the pixels in units of at least one frame period in response to high-potential voltage level information of the pixels of at least one frame which is varied and set in units of at least one frame period or may vary the level of the high-potential voltage supplied to the pixels of each preset image display block in units of at least one frame period in response to high-potential voltage level information of the pixels of each preset image display block which is varied and set in units of at least one frame period.

In an embodiment, the panel driving control part may sequentially supply a data voltage to the pixels in units of at least one horizontal line in response to an image data voltage supply period of the pixels of at least one frame which is varied and set in units of at least one frame period or may sequentially supply a data voltage to the pixels in units of at least one horizontal line in response to the image data voltage supply period of the pixels of each preset image display block which is varied and set in units of at least one frame period.

According to another aspect of the disclosure, there is provided a display device comprising pixels arranged in a display area of a display panel, and a display driver determining whether image data indicates still image characteristics or moving image characteristics and controlling a supply timing of data voltages and pixel driving control signals supplied to the pixels based on a determination result, wherein the display driver determines whether a still image is displayed based on the result of grayscale analysis of the image data and, in case of determining that the still image is displayed, drives the pixels by lowering a driving frequency of pixels of each preset block or all the pixels and a level of a high-potential voltage supplied to the pixels and increasing an image display period during which the data voltages are supplied to the pixels according to the result of grayscale analysis of the image data.

In an embodiment, the display driver may comprise a maximum luminance detection part sorting an image data input from an outside in units of at least one frame and detecting minimum and maximum grayscale values and minimum and maximum luminance values of image data of at least one frame; a load detection part comparing and analyzing grayscale values or luminance values of the image data of at least one frame and detecting load information of pixels of each preset image display block and load information of all pixels of at least one frame; an image analysis part analyzing the grayscale values and the luminance values of the image data of at least one frame using a histogram and detecting grayscale distribution information of each preset image display block and grayscale distribution information of at least one frame; and a driving frequency setting part varying and setting the driving frequency of the pixels of at least one frame in units of at least one frame period according to ranges comprising the minimum and maximum grayscale values and the minimum and maximum luminance values of the image data of at least one frame.

In an embodiment, the display driver may further comprise a load scale setting part analyzing a grayscale display range and a luminance display range of image data of each preset image display block or at least one frame according to the ranges comprising the minimum and maximum grayscale values and the minimum and maximum luminance values of the image data of at least one frame, and the driving frequency setting part may vary and set the driving frequency of the pixels of at least one frame in units of at least one frame period according to the grayscale display range and the luminance display range of the image data of each preset image display block or at least one frame.

In an embodiment, the display driver may further comprise a block driving frequency setting part varying and setting the driving frequency of the pixels of each preset image display block in units of at least one frame period according to the grayscale distribution information of each preset image display block and the grayscale distribution information of at least one frame; a driving voltage setting part varying and setting the level of the high-potential voltage supplied to the pixels in units of at least one frame period according to the ranges comprising the minimum and maximum grayscale values and the minimum and maximum luminance values of the image data of each preset image display block or at least one frame; an image display period setting part varying and setting a supply period of an image data voltage supplied to the pixels of at least one frame in response to a change in the driving frequency of the pixels of at least one frame which is varied and set in units of at least one frame period; and a panel driving control part varying the supply timing and a supply period of the pixel driving control signals and the data voltages supplied to the pixels in response to a change in the driving frequency which is varied and set in units of at least one frame period.

In an embodiment, the image display period setting part may vary and set the supply period of an image data voltage supplied to the pixels of each preset image display block in units of a preset image display block in response to a change in the driving frequency of the pixels of each preset image display block which is varied and set in units of at least one frame period.

In an embodiment, the panel driving control part may vary the supply timing and supply period of the pixel driving control signals and the data voltages sequentially supplied to the pixels of each preset image display block in response to a change in the driving frequency of the pixels of each preset image display block which is varied and set in units of at least one frame period.

In an embodiment, the panel driving control part may vary the level of the high-potential voltage supplied to the pixels in units of at least one frame period in response to high-potential voltage level information of the pixels of at least one frame which is varied and set in units of at least one frame period or may vary the level of the high-potential voltage supplied to the pixels of each preset image display block in units of at least one frame period in response to high-potential voltage level information of the pixels of each preset image display block which is varied and set in units of at least one frame period.

In an embodiment, the panel driving control part may sequentially supply a data voltage to the pixels in units of at least one horizontal line in response to an image data voltage supply period of the pixels of at least one frame which is varied and set in units of at least one frame period or may sequentially supply a data voltage to the pixels in units of at least one horizontal line in response to the image data voltage supply period of the pixels of each preset image display block which is varied and set in units of at least one frame period.

In an embodiment, the panel driving control part may sequentially supply a data voltage to the pixels in units of at least one horizontal line in response to an image data voltage supply period of the pixels of at least one frame which is varied and set in units of at least one frame period or may sequentially supply a data voltage to the pixels in units of at least one horizontal line in response to the image data voltage supply period of the pixels of each preset image display block which is varied and set in units of at least one frame period.

A display device according to embodiments can prevent image display defects (such as luminance reduction and flickering) caused by low-frequency driving, thereby maintaining or improving image display quality even during a period of reducing power consumption.

It is possible to improve power consumption reduction efficiency and product reliability by efficiently adjusting an optimal driving frequency, image display and maintenance period, and high-potential driving voltage level according to the results of analysis of characteristics such as display image grayscale distribution, load for each display area, maximum luminance value, and grayscale value.

However, the effects of the disclosure are not restricted to the one set forth herein. The above and other effects of the disclosure will become more apparent to one of daily skill in the art to which the disclosure pertains by referencing the claims.

BRIEF DESCRIPTION OF THE DRAWINGS

These and/or other aspects will become apparent and more readily appreciated from the following description of the embodiments, taken in conjunction with the accompanying drawings in which:

FIGS. 8A through 8C are schematic diagrams illustrating the results of detecting the loads of red, green, and blue pixels of the image shown in FIG. 6 for each preset block area;

FIGS. 9A through 9D are schematic diagrams illustrating the results of calculating the optimal frequencies of the red, green, and blue pixels displaying the image shown in FIG. 6 for each preset block area;

FIGS. 12A through 12C are schematic diagrams illustrating the results of detecting the loads of red, green, and blue pixels of the image shown in FIG. 10 for each preset block area;

FIGS. 13A through 13D are schematic diagrams illustrating the results of calculating the optimal frequencies of the red, green, and blue pixels displaying the image shown in FIG. 10 for each preset block area;

FIGS. 16A through 16C are schematic diagrams illustrating the results of detecting the loads of red, green, and blue pixels of the image shown in FIG. 14 for each preset block area;

FIGS. 17A through 17D are schematic diagrams illustrating the results of calculating the optimal frequencies of the red, green, and blue pixels displaying the image shown in FIG. 14 for each preset block area;

DETAILED DESCRIPTION OF THE EMBODIMENTS

Figure 1:
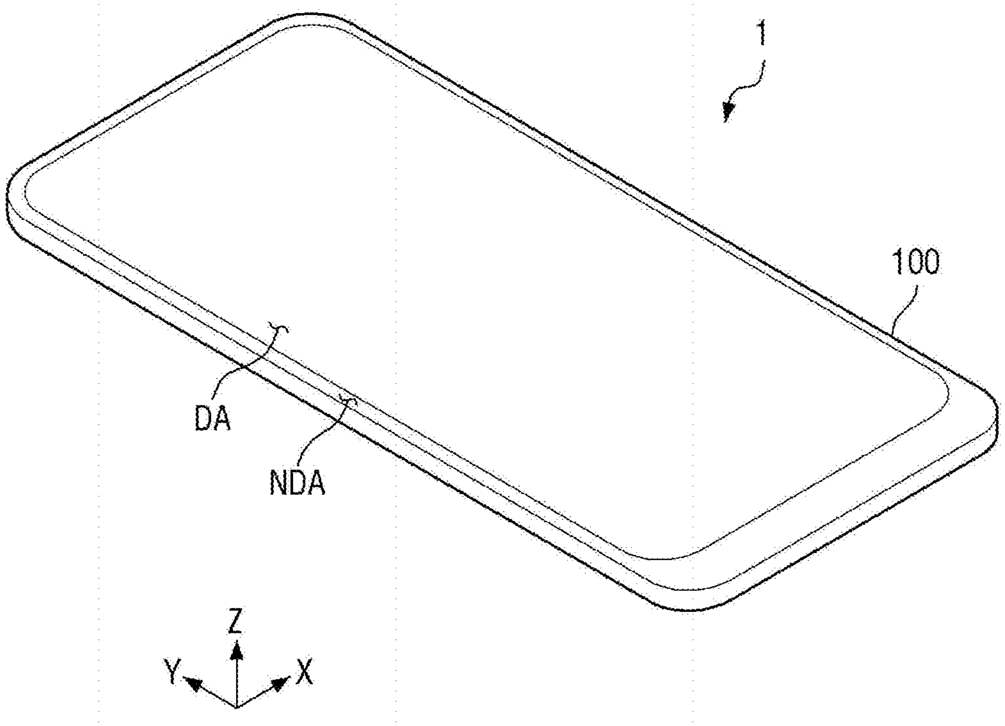
FIG. 1 is a schematic perspective view of a display device according to an embodiment.

The disclosure will now be described more fully hereinafter with reference to the accompanying drawings, in which embodiments of the disclosure are shown. This disclosure may, however, be embodied in different forms and should not be construed as limited to the embodiments set forth herein. Rather, these embodiments are provided so that this disclosure will be more thorough and complete, and will convey the scope of the disclosure to those skilled in the art.

It will also be understood that when a layer is referred to as being "on" another layer or substrate, it can be directly on the other layer or substrate, or intervening layers may also be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the disclosure. Similarly, the second element could also be termed the first element.

Each of the features of the various embodiments of the disclosure may be combined or combined with each other, in part or in whole, and technically various interlocking and driving are possible. Each embodiment may be implemented independently of each other or may be implemented together in an association.

The term "about" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

The term "and/or" includes all combinations of one or more of which associated configurations may define. For example, "A and/or B" may be understood to mean "A, B, or A and B."

For the purposes of this disclosure, the phrase "at least one of A and B" may be construed as A only, B only, or any combination of A and B. Also, "at least one of X, Y, and Z" and "at least one selected from the group consisting of X, Y, and Z" may be construed as X only, Y only, Z only, or any combination of two or more of X, Y, and Z.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

Hereinafter, embodiments will be described with reference to the accompanying drawings.

Figure 2:
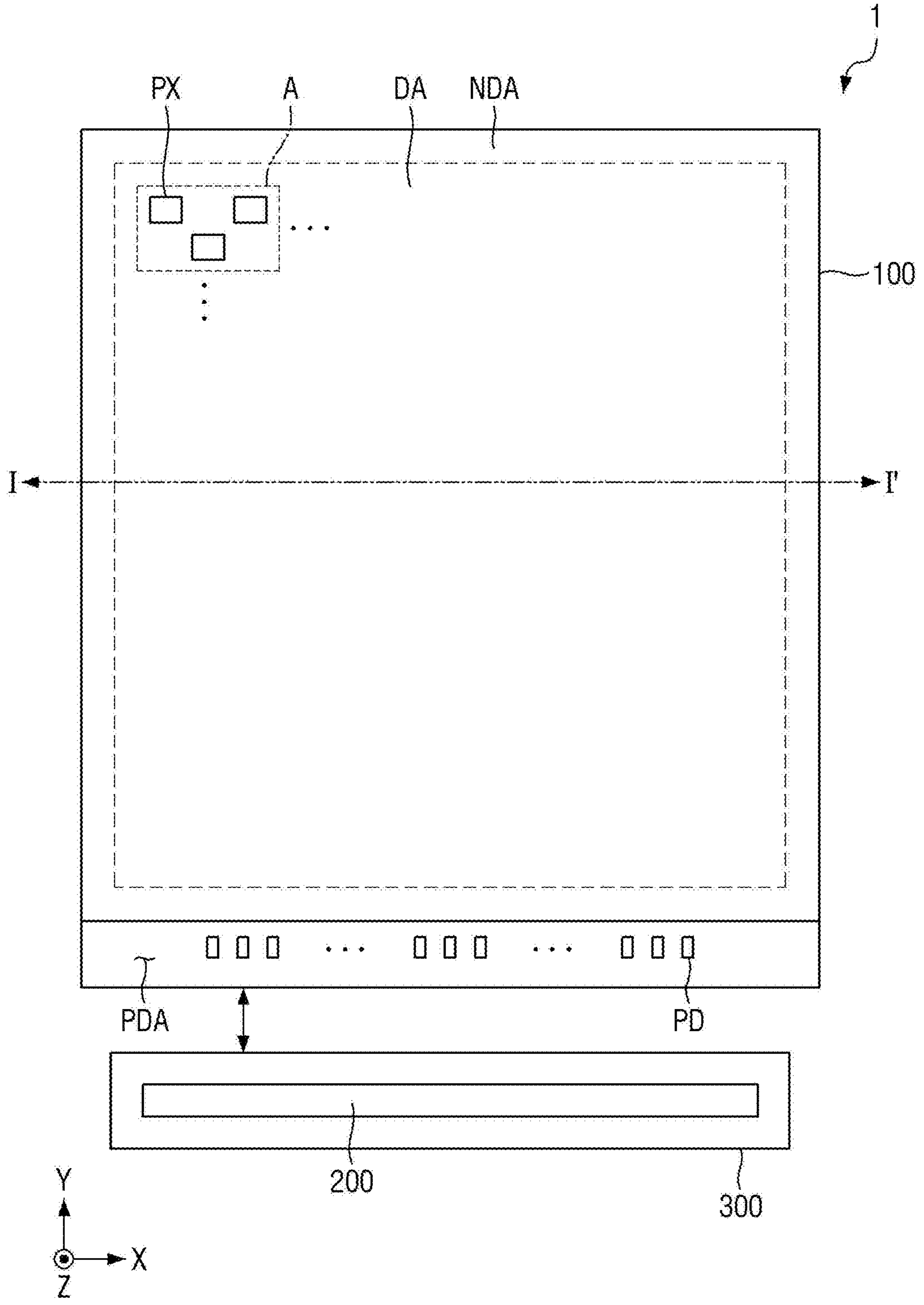
FIG. 2 is a schematic plan view of the display device according to the embodiment.

FIG. 1 is a schematic perspective view of a display device 1 according to an embodiment. FIG. 2 is a schematic plan view of the display device 1 according to the embodiment.

Referring to FIG. 1, the display device 1 may display moving images or still images. The display device 1 may refer to any electronic device that provides a display screen. Examples of the display device 1 may include televisions, laptop computers, monitors, billboards, Internet of things (IoT) devices, mobile phones, smartphones, tablet personal computers (PCs), electronic watches, smart watches, watch phones, head-mounted displays, mobile communication terminals, electronic notebooks, e-book readers, portable multimedia players (PMPs), navigation devices, game machines, digital cameras, and camcorders, all of which provide a display screen.

The display device 1 may be an inorganic light emitting diode display device, an organic light emitting display device, a quantum dot light emitting display device, a plasma display panel, or a field emission display device. A case where an organic light emitting diode display device is applied as an example of the display device 1 will be described below, but the disclosure is not limited to this case, and other display devices can also be applied as long as the same technical spirit is applicable.

The shapes of the display device 1 and a display panel 100 may be variously modified. For example, the display device 1 may have various shapes such as a horizontally long rectangle, a vertically long rectangle, a square, a quadrilateral with rounded corners (vertices), other polygons, and a circle. The shape of a display area DA of the display panel 100 may also be similar to the overall shape of the display device 1. In FIG. 1, the display device 1 may be shaped like a rectangle that is long in a second direction Y, but the disclosure is not limited thereto.

Referring to FIGS. 1 and 2, the display device 1 may include the display panel 100, a display driver 200, and a circuit board 300.

The display panel 100 may be shaped as a rectangular plane having short sides in a first direction (X-axis direction) and long sides in the second direction (Y-axis direction). Each corner where a short side extending in the first direction (X-axis direction) meets a long side extending in the second direction (Y-axis direction) may be rounded with a curvature (e.g., a predetermined or selectable curvature) or may be right-angled. The planar shape of the display panel 100 is not limited to a quadrilateral shape and may also be other polygonal shapes, a circular shape, or an oval shape. The display device 1 and the display panel 100 may be formed flat, but the disclosure is not limited thereto. The display device 1 and the display panel 100 may also include curved portions formed at left and right ends thereof and having a constant or varying curvature. The display device 1 and the display panel 100 may be formed to be flexible so that they can be curved, bent, folded, or rolled.

The display panel 100 may include the display area DA, a non-display area NDA, and a pad area PDA.

The display area DA of the display panel 100 may generally occupy the center of the display device 1. Pixels PX may be disposed in the display area DA. Each of the pixels PX may be defined as a smallest unit that emits light. The pixels PX may be electrically connected to signal lines located in the non-display area NDA. The display area DA may emit light from emission areas or openings included in the pixels PX.

The non-display area NDA may be an area outside the display area DA. The non-display area NDA may be an area outside edges of the display area DA and may be an area surrounding the display area DA. The non-display area NDA may include a gate driver (not illustrated) supplying gate signals to gate lines and fanout lines (not illustrated) electrically connecting the display driver 200 and the display area DA.

The display driver 200 may output signals and voltages for driving the display panel 100. Specifically, the display driver 200 may output signals and voltages for driving the pixels PX disposed in the display area DA. The display driver 200 may supply data voltages to data lines of the display panel 100. The display driver 200 may supply a power supply voltage to a power line and a gate control signal to the gate driver of the display panel 100.

The display driver 200 may selectively adjust a driving frequency for driving the pixels PX of the display panel 100, the level of a high-potential voltage supplied to the pixels PX, and an image display period (active period) of at least one frame based on the characteristics of an image displayed on the display panel 100 and the result of analysis of image data.

Specifically, the display driver 200 may adjust the power consumption of the display panel 100 according to the characteristics of an image displayed on the display panel 100, for example, the display characteristics of a still image, a moving image, or a repetitive image. For example, the display driver 200 may reduce the power consumption of the display panel 100 according to still image or repetitive image characteristics. To this end, the display driver 200 may analyze the characteristics of an image displayed on the display panel 100, for example, image data and may selectively adjust the driving frequency for driving the pixels PX of the display panel 100, the level of the high-potential voltage supplied to the pixels PX, and the image display period (active period) of at least one frame according to the analysis result. The display driver 200 may determine that a still image or a repetitive image is displayed on the display panel 100 based on the result of analysis of the image data. In case that a still image or a repetitive image is displayed, the display driver 200 may drive the pixels PX by lowering the driving frequency of the pixels PX and the level of the high-potential voltage supplied to the pixels PX and increasing the image display period of at least one frame according to the result of analysis of the image data. Conversely, in case that a moving image is displayed, the display driver 200 may drive the pixels PX by increasing the driving frequency of the pixels PX and the level of the high-potential voltage supplied to the pixels PX and reducing the image display period of at least one frame according to the result of analysis of the image data.

The circuit board 300 may be attached onto a pad part of the display panel 100 using an anisotropic conductive film (ACF). Lead lines of the circuit board 300 may be electrically connected to the pad part of the display panel 100. The circuit board 300 may be a flexible printed circuit board, a printed circuit board, or a flexible film such as a chip-on-film. The display driver 200 may be formed as an integrated circuit and mounted on the display panel 100 using, e.g., a chip-on-glass (COG) method, a chip-on-plastic (COP) method, or an ultrasonic bonding method. The display driver 200 may be formed as an integrated circuit and mounted on the circuit board 300 using, e.g., a COG method, a COP method, or an ultrasonic bonding method. As another example, the display driver 200 may be mounted on the display panel 100 using, e.g., a COG method, a COP method, or an ultrasonic bonding method.

Display pads PD may be disposed in the pad area PDA of the display panel 100. The display pads PD may be disposed at an edge of the pad area PDA. The display pads PD may be electrically connected to a graphics system through the circuit board 300. The display pads PD may be electrically connected to the circuit board 300 to receive digital video data and may supply the digital video data to the display driver 200.

Figure 3:
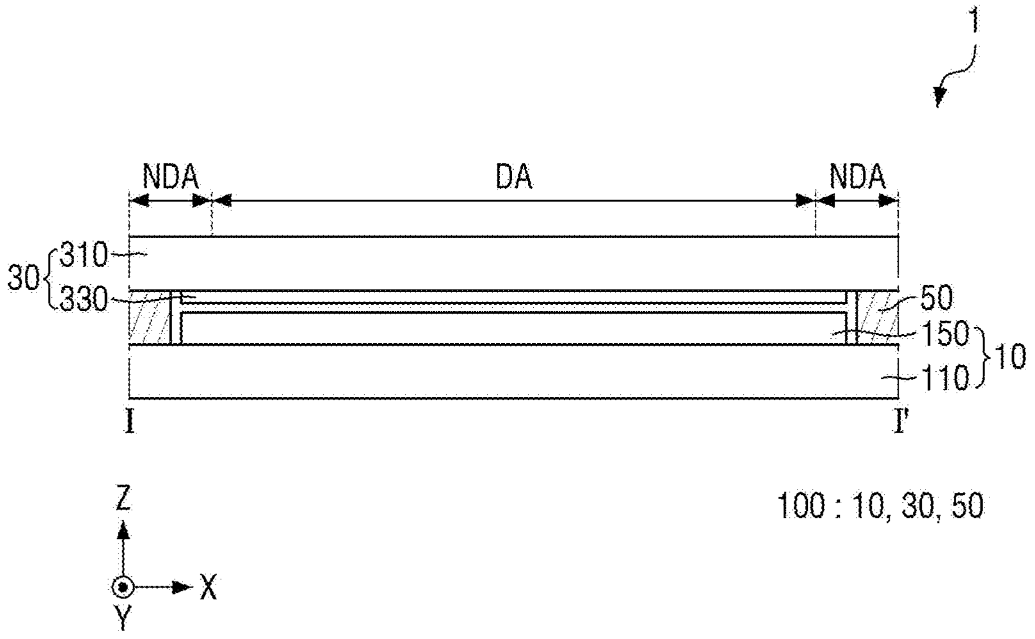
FIG. 3 is a schematic cross-sectional view of a display panel of FIG. 2, taken along line I-I'.

FIG. 3 is a schematic cross-sectional view of the display panel 100 of FIG. 2, taken along line I-I'.

Referring to FIG. 3, in a schematic stacked structure of the display device 1, the display device 1 may include a first substrate 10, a second substrate 30 facing the first substrate 10, and a sealing portion 50 bonding the first substrate 10 and the second substrate 30 together. The first substrate 10 may include a first base substrate 110 and a light emitting element layer 150, and the second substrate 30 may include a second base substrate 310 and a hydrogen donor layer 330.

The first base substrate 110 may be a base substrate or a base member. The first base substrate 110 may be a flexible substrate that can be bent, folded, or rolled. For example, the first base substrate 110 may include polymer resin such as polyimide (PI), but the disclosure is not limited thereto. For another example, the first base substrate 110 may include a glass material or a metal material.

The light emitting element layer 150 may include pixel circuits including switching elements, a pixel defining layer defining emission areas or opening areas, and self-light emitting elements. For example, each of the self-light emitting elements may include, but is not limited to, at least one of an organic light emitting diode including an organic light emitting layer, a quantum dot light emitting diode including a quantum dot light emitting layer, an inorganic light emitting diode including an inorganic semiconductor, and a micro-light emitting diode.

The second base substrate 310 may be made of (or include) various materials such as a glass material, a metal material, or a plastic material such as polyethylene terephthalate (PET), polyethylene naphthalate (PEN), or polyimide. The second base substrate 310 may include ultra-thin glass (UTG) with a thickness of about 0.01 mm or less. The second base substrate 310 may prevent the penetration and diffusion of impurities such as moisture or air from the outside into the light emitting element layer 150 of the first base substrate 110.

The hydrogen donor layer 330 may be formed on the second base substrate 310. The hydrogen donor layer 330 may be deposited on the second base substrate 310 and bonded to the first base substrate 110 by the sealing portion 50 through a subsequent process. Accordingly, the hydrogen donor layer 330 may be located between the first base substrate 110 and the second base substrate 310. The hydrogen donor layer 330 may face the light emitting element layer 150 and overlap the light emitting element layer 150.

The hydrogen donor layer 330 may be an inorganic layer including, e.g., silicon. For example, the hydrogen donor layer 330 may include silicon oxide ($SiO_2$), silicon nitride ($Si_3N_4$), or silicon oxynitride ($Si_2N_2O$).

The sealing portion 50 may overlap the non-display area NDA and may be disposed along edges of the first base substrate 110 and the second base substrate 310 to surround the display area DA in plan view. The first base substrate 110 and the second base substrate 310 may be bonded to each other by the sealing portion 50. The sealing portion 50 may prevent the penetration and diffusion of impurities such as moisture or air from the outside into the light emitting element layer 150 of the first substrate 10. For example, the sealing portion 50 may include an organic material based on an epoxy resin and an inorganic material based on a glass component.

Figure 4:
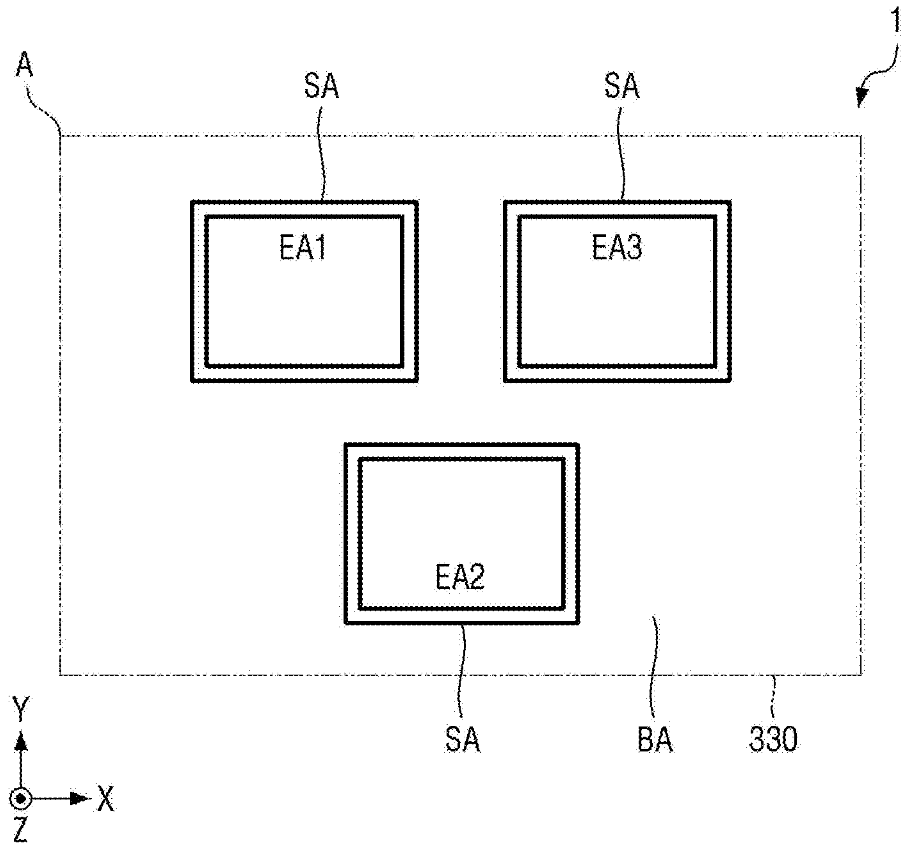
FIG. 4 is a schematic enlarged plan view of area 'A' in FIG. 2.

FIG. 4 is a schematic enlarged plan view of area 'A' in FIG. 2.

Referring to FIG. 4, the display device 1 may include emission areas EA1 to EA3 disposed in the display area DA. The emission areas EA1 to EA3 may include first emission areas EA1, second emission areas EA2, and third emission areas EA3 which emit light of different colors. Each of the emission areas EA1 to EA3 may emit red, green, or blue light, and the color of light emitted from each of the emission areas EA1 to EA3 may vary according to the type of light emitting element disposed in a light emitting element layer of the emission area EA1, EA2, or EA3. In an embodiment, the first emission areas EA1 may emit red first light, the second emission areas EA2 may emit green second light, and the third emission areas EA3 may emit blue third light.

A non-emission area BA may be an area surrounding each of the emission areas EA1 to EA3. The non-emission area BA may be an area through which light does not pass, but the disclosure is not limited thereto. Light may or may not pass through the non-emission area BA depending on the material included in the pixel defining layer.

In some embodiments, the display device 1 may include spaces SA surrounding the emission areas EA1 to EA3, respectively. The spaces SA may be created by the bonding of the first base substrate 110 and the second base substrate 310. Each of the spaces SA may be filled with nitrogen gas ($N_2$) or air depending on the atmosphere of a manufacturing process. The spaces SA will be described in detail below.

In some embodiments, the hydrogen donor layer 330 may cover (or overlap) all of the emission areas EA1 to EA3, the spaces SA, and the non-emission area BA.

Figure 5:
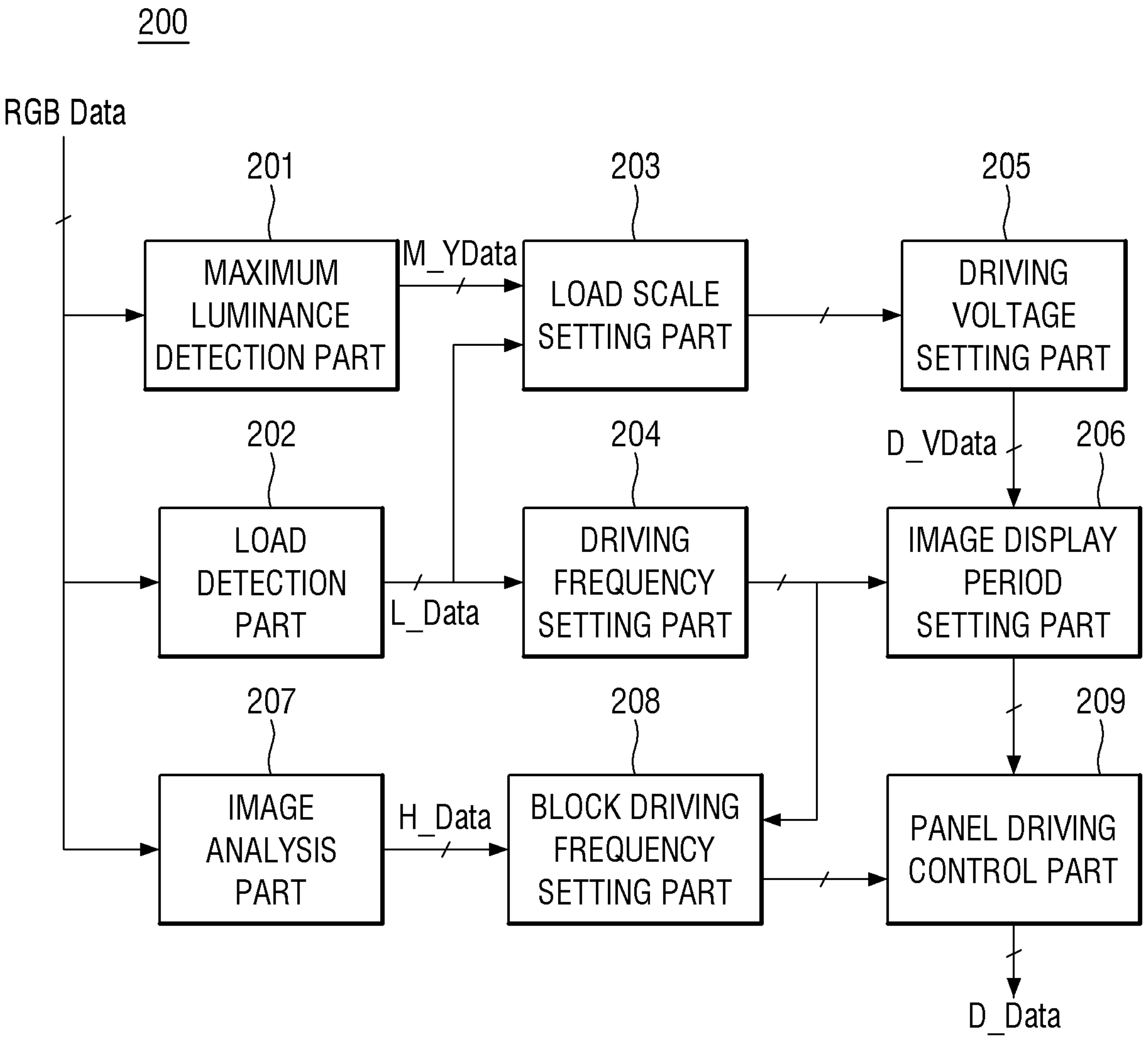
FIG. 5 is a block diagram of a display driver illustrated in FIG. 2.

FIG. 5 is a schematic detailed block diagram of the display driver 200 illustrated in FIG. 2.

Referring to FIG. 5, the display driver 200 of an embodiment may include a maximum luminance detection part 201, a load detection part 202, an image analysis part 207, a load scale setting part 203, a driving frequency setting part 204, a driving voltage setting part 205, an image display period setting part 206, a block driving frequency setting part 208, and a panel driving control part 209.

The maximum luminance detection part 201 may sort image data RGB Data input from the outside in units of at least one frame and may detect minimum and maximum grayscale values and minimum and maximum luminance values of image data of at least one frame. Specifically, the maximum luminance detection part 201 may sequentially compare and analyze grayscale values and luminance values of pixels PX included in the image data of at least one frame and may detect a maximum grayscale value and a maximum luminance value of each frame or at least one frame. The maximum luminance detection part 201 may transmit maximum grayscale data including the detected maximum grayscale value and maximum luminance data M_YData to the load scale setting part 203.

The maximum luminance detection part 201 may divide the image data RGB Data input from the outside into preset block areas for each frame and may detect minimum and maximum grayscale values and minimum and maximum luminance values of image data of each block area.

The load detection part 202 may compare and analyze the grayscale values or the luminance values of the image data of at least one frame and may detect load information of pixels PX of each preset image display block and load information of all pixels PX of at least one frame. Specifically, the load detection part 202 may detect and analyze a maximum grayscale value, a maximum luminance value, an average grayscale value, or an average luminance value from the grayscale values and the luminance values of the pixels PX included in the image data of at least one frame. The load detection part 202 may calculate or detect the load on at least one pixel PX or all pixels PX based on the maximum grayscale value, the maximum luminance value, the average grayscale value, or the average luminance value of the image data of at least one frame. The load detection part 202 may calculate the load using a preset load detection equation or may detect the load from a database pre-stored in a memory such as a lookup table using experimental values. The load detection part 202 may transmit load data L_Data including the load calculation result value to the image display driving frequency setting part 204 and the load scale setting part 203. The load detection part 202 may supply the detected maximum grayscale value, maximum luminance value, average grayscale value, or average luminance value to the image analysis part 207, the load scale setting part 203, the driving frequency setting part 204, the driving voltage setting part 205, the image display period setting part 206, and the block driving frequency setting part 208.

The image analysis part 207 may analyze the grayscale values and the luminance values of the image data of at least one frame using a histogram and may detect grayscale distribution information of each preset image display block and grayscale distribution information of at least one frame. The image analysis part 207 may sequentially compare the grayscale distribution information of each preset image display block and the grayscale distribution information of at least one frame with grayscale distribution information of at least one previous frame and may detect still image or moving image characteristics of the image data RGB Data input from the outside based on the comparative analysis result. The image analysis part 207 may supply the grayscale distribution information of each image display block and the grayscale distribution information of at least one frame (H_Data) to the driving frequency setting part 204, the driving voltage setting part 205, the image display period setting part 206, and the block driving frequency setting part 208.

The load scale setting part 203 may analyze a grayscale display range and a luminance display range of the image data of each preset image display block or at least one frame according to ranges including the minimum and maximum grayscale values and the minimum and maximum luminance values of the image data of at least one frame.

The driving frequency setting part 204 may vary and set the driving frequency of the pixels PX of at least one frame in units of at least one frame period according to the ranges including the minimum and maximum grayscale values and the minimum and maximum luminance values of the image data of at least one frame. As another example, the driving frequency setting part 204 may vary and set the driving frequency of the pixels PX of at least one frame in units of at least one frame period according to the grayscale display range and the luminance display range of the image data of each preset image display block or at least one frame.

The block driving frequency setting part 208 may vary and set the driving frequency of the pixels PX of each preset image display block in units of at least one frame period according to the grayscale distribution information of each preset image display block and the grayscale distribution information of at least one frame.

The driving voltage setting part 205 may vary and set the level of a high-potential driving voltage supplied to the pixels PX of at least one frame in units of at least one frame period according to the ranges including the minimum and maximum grayscale values and the minimum and maximum luminance values of the image data of at least one frame. The driving voltage setting part 205 may vary and set the level of a high-potential driving voltage supplied to the pixels PX of each preset image display block according to ranges including the minimum and maximum grayscale values and the minimum and maximum luminance values of the image data of each preset image display block.

The image display period setting part 206 may vary and set a period of supplying an image data voltage to the pixels PX of at least one frame, for example, an image data writing and displaying period of the pixels PX of at least one frame in response to a change in the driving frequency of the pixels PX of at least one frame which is varied and set in units of at least one frame period. As the period of supplying the image data voltage, for example, the image data writing and displaying period increases, a period during which a displayed image is maintained may decrease. Conversely, as the image data writing and displaying period decreases, the period during which the displayed image is maintained may increase.

The image display period setting part 206 may vary and set a period of supplying an image data voltage to the pixels PX of each preset image display block in units of a preset image display block in response to a change in the driving frequency of the pixels PX of each preset image display block which is varied and set in units of at least one frame period. Likewise, as the period of supplying the image data voltage (for example, the image data writing and displaying period) increases, a period during which a displayed image is maintained may decrease. Conversely, as the image data writing and displaying period decreases, the period during which the displayed image is maintained may increase.

The panel driving control part 209 may vary the supply timing and supply period of pixel driving control signals (e.g., scan signals, emission control signals, and reset signals) and data voltages sequentially supplied to the pixels PX of at least one horizontal line in response to a change in the driving frequency of the pixels PX of at least one frame which is varied and set in units of at least one frame period. The panel driving control part 209 may vary the supply timing and supply period of pixel driving control signals (e.g., scan signals, emission control signals, and reset signals) and data voltages sequentially supplied to the pixels PX of each preset image display block in response to a change in the driving frequency of the pixels PX of each preset image display block which is varied and set in units of at least one frame period.

The panel driving control part 209 may vary the level of the high-potential driving voltage supplied to the pixels PX in units of at least one frame period in response to high-potential driving voltage level information of the pixels PX of at least one frame which is varied and set in units of at least one frame period. The panel driving control part 209 may vary the level of the high-potential driving voltage supplied to the pixels PX of each preset image display block in response to high-potential driving voltage level information of the pixels PX of each preset image display block which is varied and set in units of at least one frame period.

The panel driving control part 209 may sequentially supply a data voltage D_Data to the pixels PX in units of at least one horizontal line in response to the image data voltage supply period of the pixels PX of at least one frame which is varied and set in units of at least one frame period. The panel driving control part 209 may sequentially supply a data voltage D_Data to the pixels PX in units of at least one horizontal line in response to the image data voltage supply period of the pixels PX of each preset image display block which is varied and set in units of at least one frame period.

Figure 6:
FIG. 6 shows an image of a first embodiment displayed in a display area of the display panel.
Figure 7:
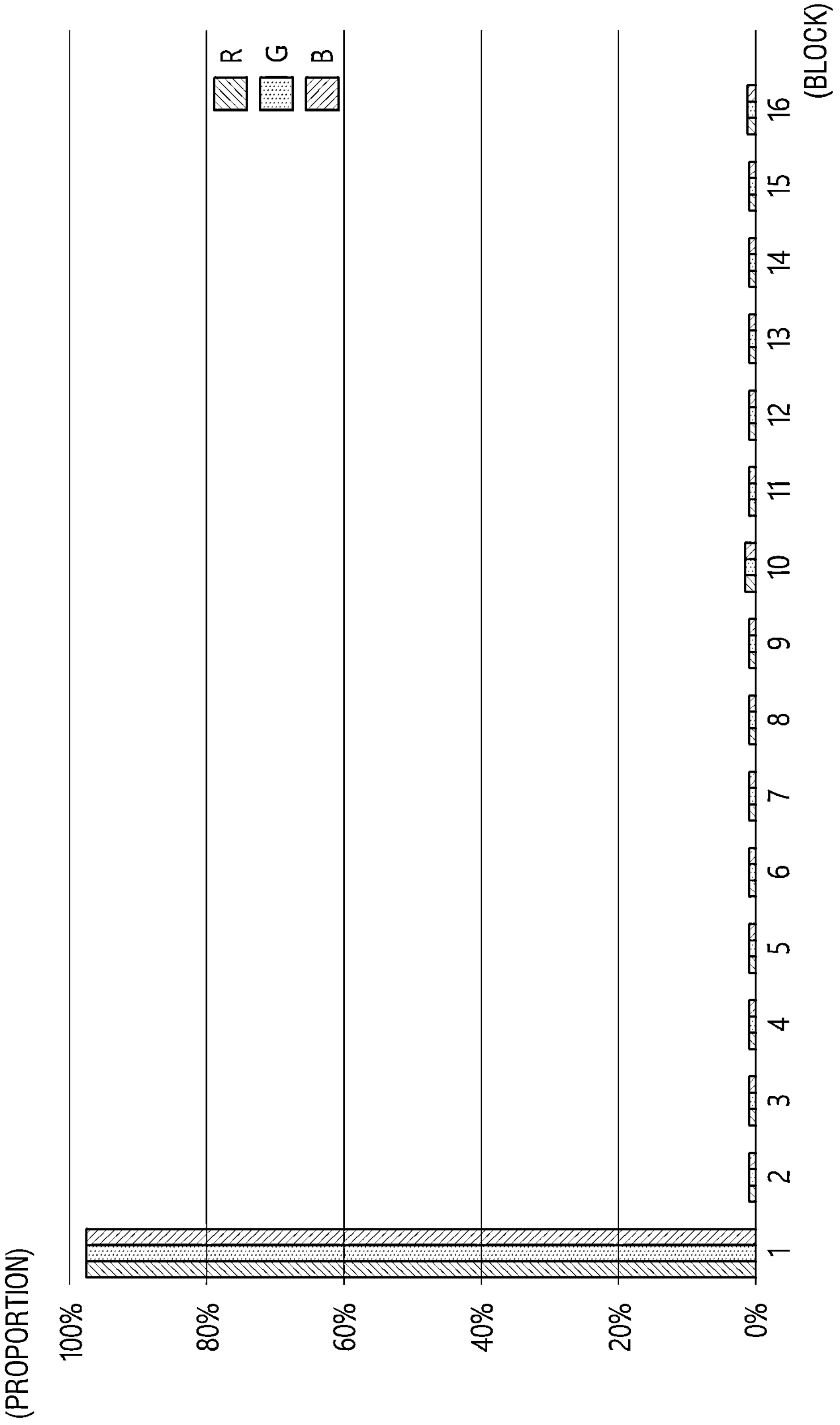
FIG. 7 is a graph illustrating the results of histogram analysis of the image shown in FIG. 6.

FIG. 6 illustrates an image of a first embodiment displayed in the display area DA of the display panel 100. FIG. 7 is a schematic graph illustrating the results of histogram analysis of the image shown in FIG. 6.

Referring to FIGS. 6 and 7, the image analysis part 207 may analyze grayscale values and luminance values of image data of at least one frame using a histogram and may detect grayscale distribution information of each preset image display block and grayscale distribution information of at least one frame.

The image analysis part 207 may classify the image data of at least one frame into red, green, and blue data and may analyze and display the number of each of the red, green, and blue data and the proportion of each of the red, green, and blue data based on each preset grayscale value using a histogram. The image analysis part 207 may analyze the number of each of the red, green, and blue data and the proportion of each of the red, green, and blue data based on each preset luminance value using a histogram.

The image analysis part 207 may detect grayscale distribution information of each of the red, green, and blue data for at least one frame or for each preset image display area or image display block.

Figure 8A:
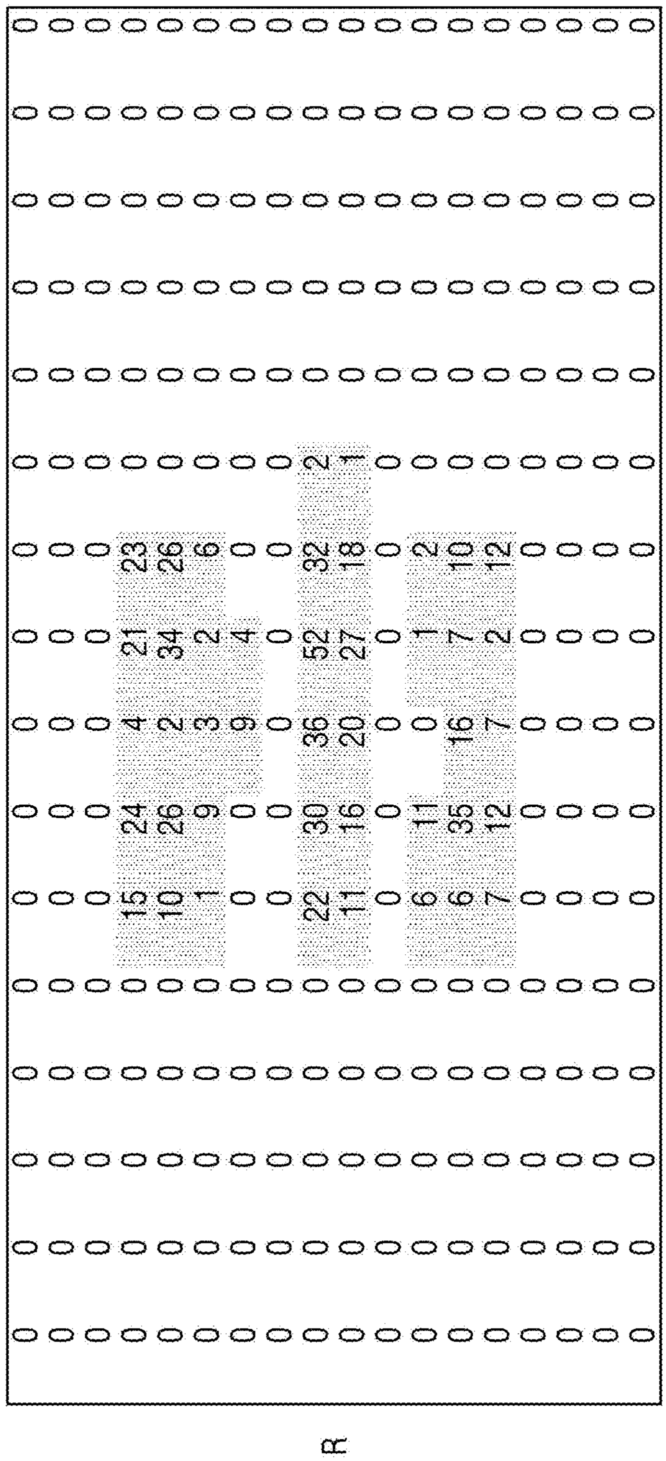
Figure 8C:
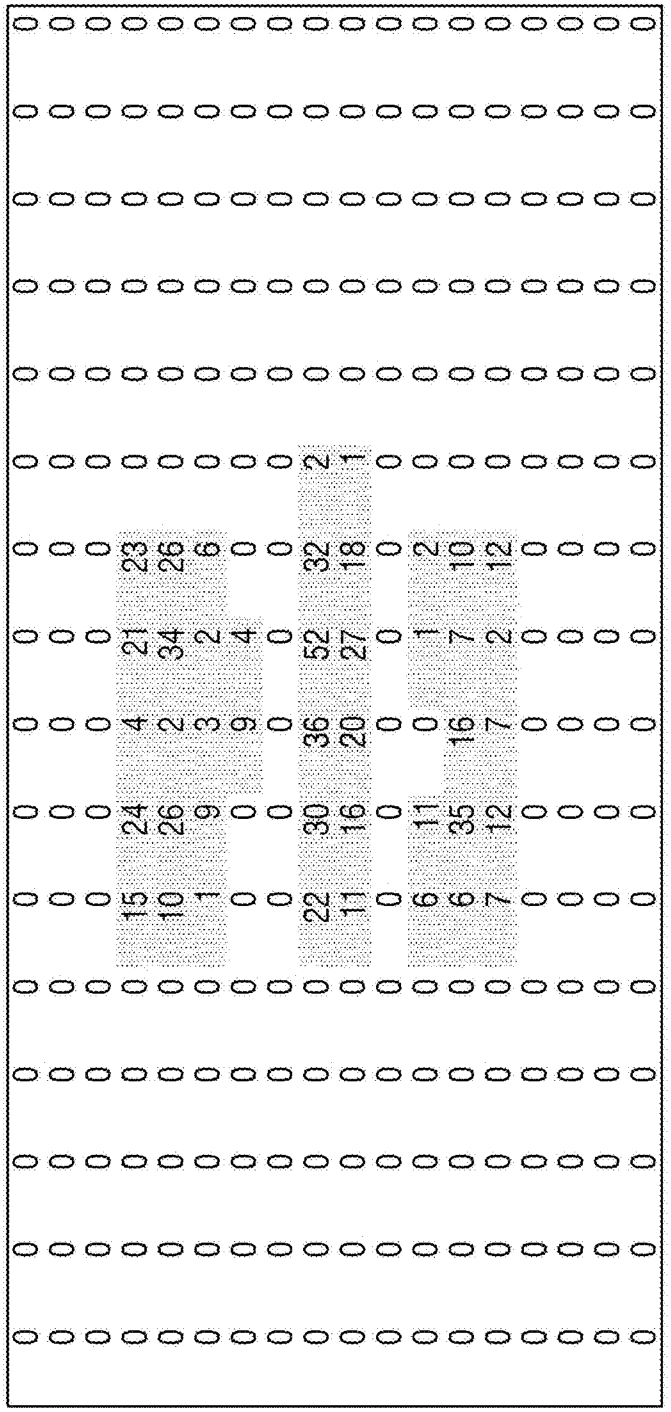

FIGS. 8A to 8C are schematic diagrams illustrating the results of detecting the loads of red, green, and blue pixels of the image shown in FIG. 6 for each preset block area.

Specifically, FIG. 8A is a schematic diagram illustrating the load detection result according to the grayscale value of red image data of each preset block area. FIG. 8B is a schematic diagram illustrating the load detection result according to the grayscale value of green image data of each preset block area. FIG. 8C is a schematic diagram illustrating the load detection result according to the grayscale value of blue image data of each preset block area.

Referring to FIGS. 8A to 8C, the load detection part 202 may compare and analyze grayscale values or luminance values of red, green, and blue image data of at least one frame and may detect load information of red, green, and blue pixels PX of each preset image display block. Here, the load detection part 202 may detect the load information of all red, green, and blue pixels PX of at least one frame or may detect the load information of all red, green, and blue pixels PX of each preset block area.

The load detection part 202 may detect and analyze a maximum grayscale value, a maximum luminance value, an average grayscale value, or an average luminance value from the grayscale values and the luminance values of the red, green, and blue pixels PX included in the image data of at least one frame. The load detection part 202 may calculate or detect the load on each block area or all pixels PX based on the maximum grayscale value, the maximum luminance value, the average grayscale value, or the average luminance value of the image data of at least one frame. The load detection part 202 may calculate the load using a preset load detection equation or may detect or derive the loads of the red, green, and blue pixels of each block area from a database pre-stored in a memory such as a lookup table using experimental values. The load may be derived as a value that decreases to about 0 toward black and increases to about 10 or about 100 toward white.

FIGS. 9A to 9D are schematic diagrams illustrating the results of calculating the optimal frequencies of the red, green, and blue pixels displaying the image shown in FIG. 6 for each preset block area.

Specifically, FIG. 9A is a schematic diagram illustrating the driving frequency detection result according to the load detection result of the red image data of each preset block area. FIG. 9B is a schematic diagram illustrating the driving frequency detection result according to the load detection result of the green image data of each preset block area. FIG. 9C is a schematic diagram illustrating the driving frequency detection result according to the load detection result of the blue image data of each preset block area. FIG. 9D is a schematic diagram illustrating the result of detecting a driving frequency matched to a load corresponding to a luminance value of each preset block area.

The driving frequency setting part 204 or the block driving frequency setting part 208 may vary and set the driving frequency of pixels PX of at least one frame in units of at least one frame period according to a grayscale display range and a luminance display range of the image data of each preset image display block or at least one frame.

The driving frequency setting part 204 or the block driving frequency setting part 208 may calculate the driving frequency using a preset frequency detection equation or, as shown in Table 1 below, may detect or derive the driving frequencies of the red, green, and blue pixels PX of each block area from a database stored (or pre-stored in a memory such as a lookup table using experimental values. The driving frequency may be derived as a value that decreases to about 0.1 Hz toward black and increases to about 60 Hz or about 120 Hz toward white.

TABLE 1

| Optimal Frequency LUT | | |
|---|---|---|
| | Frequency | |
| Load | Normal | AOD |
| 0 | 0.1 | 0.1 |
| 1 | 0.5 | 0.1 |
| 2 | 1 | 0.1 |
| 3 | 10 | 0.1 |
| 4 | 10.5 | 0.1 |
| . | . | . |
| . | . | . |
| . | . | . |
| 10 | 30 | 10 |
| 11 | 30 | 10 |
| 12 | 30 | 10 |
| 13 | 30 | 10 |
| 14 | 30 | 10 |
| . | . | . |
| . | . | . |
| . | . | . |
| 1024 | 0.1 | 0.1 |

The driving voltage setting part 205 may vary and set the level of a high-potential driving voltage supplied to the pixels PX of each preset image display block according to ranges including minimum and maximum grayscale values and minimum and maximum luminance values of the image data of each preset image display block. The driving voltage setting part 205 may calculate the level of the high-potential driving voltage using a preset driving voltage detection equation or, as shown in Table 2 below, may detect or derive the level of the high-potential driving voltage applied to the pixels PX of each block area from a database pre-stored in a memory such as a lookup table using experimental values.

TABLE 2

| Low-Frequency ELVDD LUT | |
|---|---|
| Scalied Load | ELVDD (V) |
| 1 | 10 |
| 2 | 10.1 |
| 3 | 10.2 |
| 4 | 10.3 |
| 5 | 10.4 |
| 6 | 10.5 |
| 7 | 10.6 |
| 8 | 10.7 |
| . | . |
| . | . |
| . | . |
| 1024 | 20 |

The image display period setting part 206 may vary and set a period of supplying an image data voltage to the pixels PX of at least one frame, for example, an image data writing and displaying period of the pixels PX of at least one frame in response to a change in the driving frequency of the pixels PX of at least one frame which is varied and set in units of at least one frame period.

The image display period setting part 206 may calculate an image data writing period (Active Time (ms)) using a preset timing detection equation or, as shown in Table 3 below, may detect or derive image data writing period (Active Time (ms)) information for the pixels PX of each block area from a database pre-stored in a memory such as a lookup table using experimental values.

TABLE 3

| Optimal Frequency LUT | | |
|---|---|---|
| | Frequency | |
| Load | Normal | AOD |
| 0 | 0.1 | 0.1 |
| 1 | 0.5 | 0.1 |
| 2 | 1 | 0.1 |
| 3 | 10 | 0.1 |
| 4 | 10.5 | 0.1 |
| . | . | . |
| . | . | . |
| . | . | . |
| 10 | 30 | 10 |
| 11 | 30 | 10 |
| 12 | 30 | 10 |
| 13 | 30 | 10 |
| 14 | 30 | 10 |
| . | . | . |
| . | . | . |
| . | . | . |
| 1024 | 0.1 | 0.1 |

Figure 10:
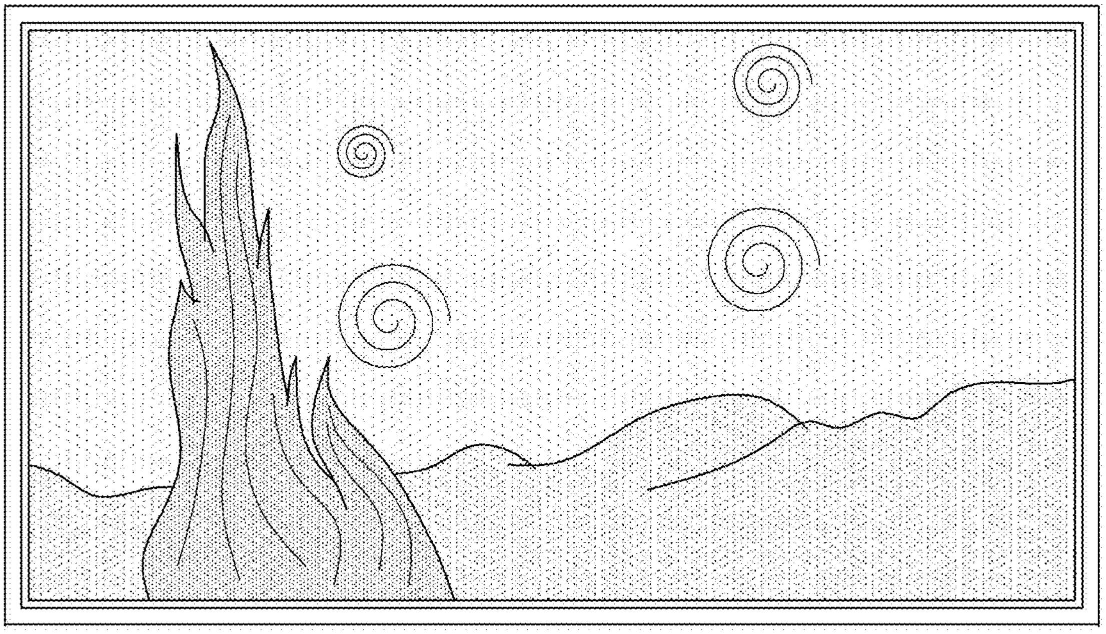
FIG. 10 shows an image of a second embodiment displayed in the display area of the display panel.
Figure 11:
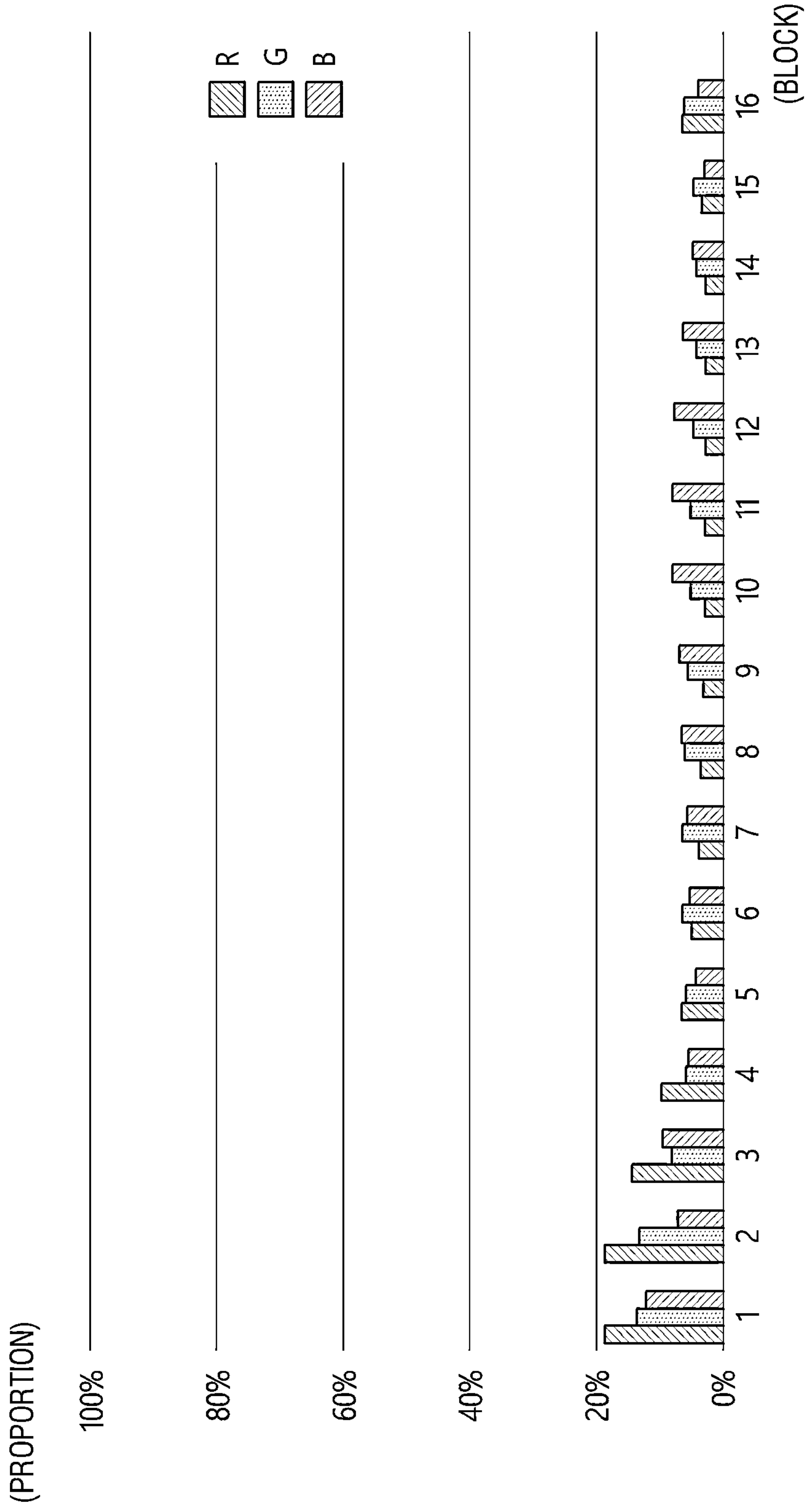
FIG. 11 is a graph illustrating the results of histogram analysis of the image shown in FIG. 10.

FIG. 10 illustrates an image of a second embodiment displayed in the display area DA of the display panel 100. FIG. 11 is a schematic graph illustrating the results of histogram analysis of the image shown in FIG. 10.

Referring to FIGS. 10 and 11, the image analysis part 207 may classify image data of at least one frame into red, green, and blue data and may analyze and display the number of each of the red, green, and blue data and the proportion of each of the red, green, and blue data based on each preset grayscale value using a histogram.

The image analysis part 207 may detect grayscale distribution information of each of the red, green, and blue data for at least one frame or for each preset image display area or image display block. The image analysis part 207 may analyze the number of each of the red, green, and blue data and the proportion of each of the red, green, and blue data based on each preset luminance value using a histogram.

FIGS. 12A to 12C are schematic diagrams illustrating the results of detecting the loads of red, green, and blue pixels of the image shown in FIG. 10 for each preset block area.

Specifically, FIG. 12A is a schematic diagram illustrating the load detection result according to the grayscale value of red image data of each preset block area. FIG. 12B is a schematic diagram illustrating the load detection result according to the grayscale value of green image data of each preset block area. FIG. 12C is a schematic diagram illustrating the load detection result according to the grayscale value of blue image data of each preset block area.

The load detection part 202 may calculate the load using a preset load detection equation or may detect or derive the loads of the red, green, and blue pixels of each block area from a database pre-stored in a memory such as a lookup table using experimental values. The load may be derived as a value that decreases to about 0 toward black and increases to about 10 or about 100 toward white.

FIGS. 13A to 13D are schematic diagrams illustrating the results of calculating the optimal frequencies of the red, green, and blue pixels displaying the image shown in FIG. 10 for each preset block area.

Specifically, FIG. 13A is a schematic diagram illustrating the driving frequency detection result according to the load detection result of the red image data of each preset block area. FIG. 13B is a schematic diagram illustrating the driving frequency detection result according to the load detection result of the green image data of each preset block area. FIG. 13C is a schematic diagram illustrating the driving frequency detection result according to the load detection result of the blue image data of each preset block area. FIG. 13D is a schematic diagram illustrating the result of detecting a driving frequency matched to a load corresponding to a luminance value of each preset block area.

The driving frequency setting part 204 or the block driving frequency setting part 208 may calculate the driving frequency using a preset frequency detection equation or may detect or derive the driving frequencies of the red, green, and blue pixels PX for each block area from a database pre-stored in a memory such as a lookup table using experimental values. The driving frequency may be derived as a value that decreases to about 0.1 Hz toward black and increases to about 60 Hz or about 120 Hz toward white.

Figure 14:
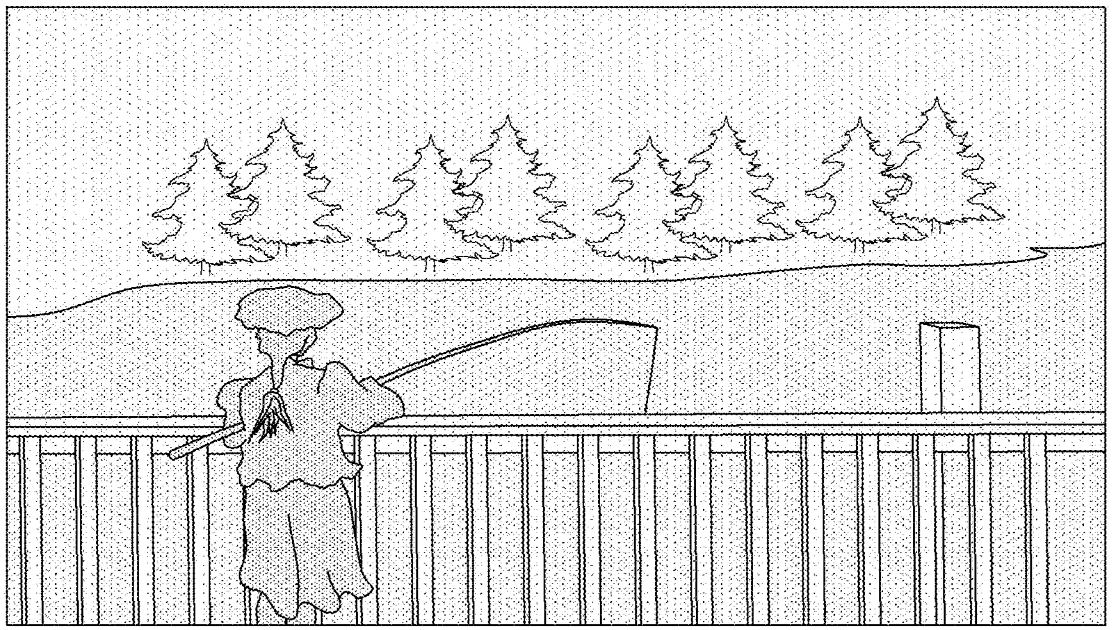
FIG. 14 shows an image of a third embodiment displayed in the display area of the display panel.
Figure 15:
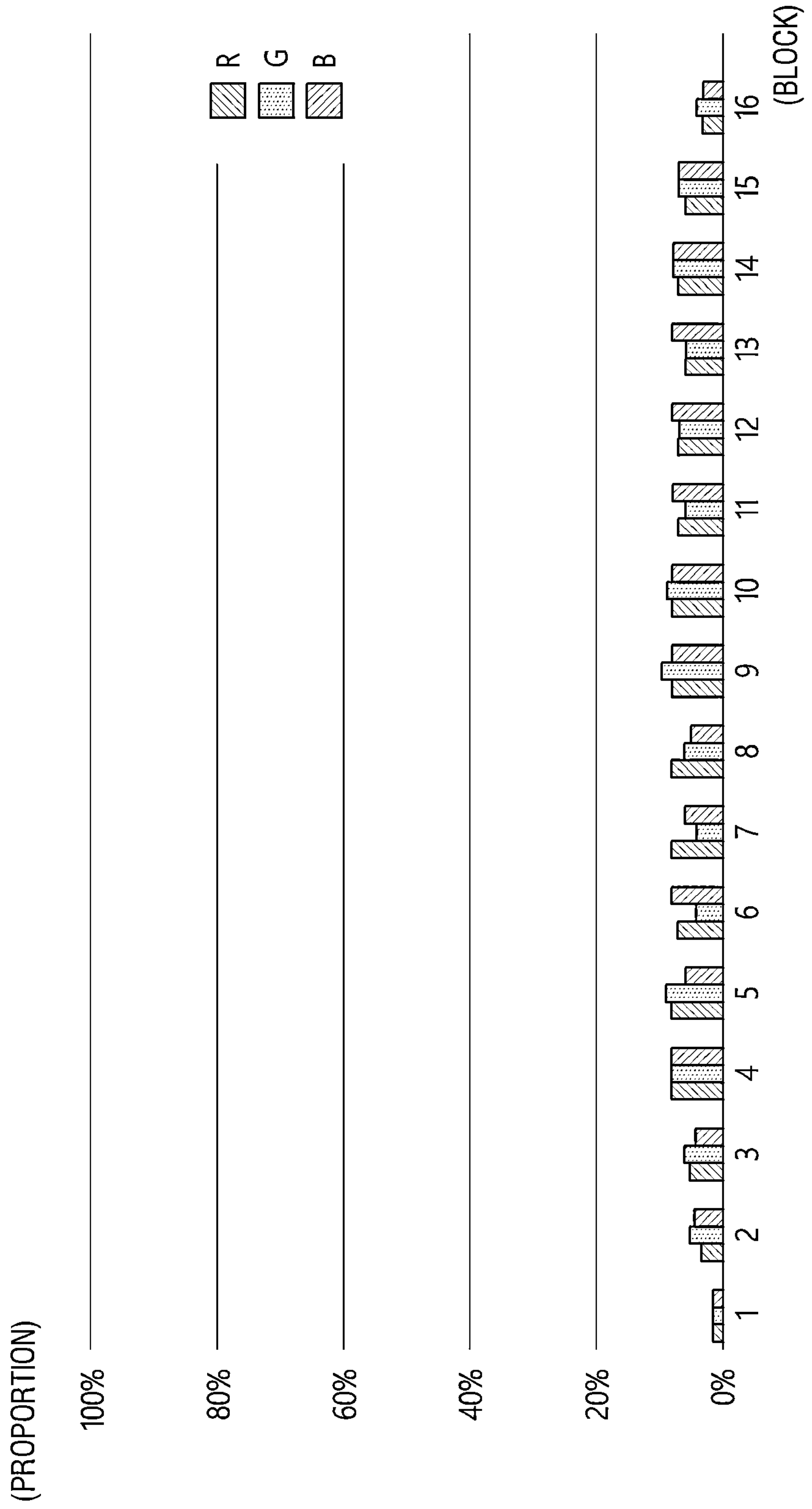
FIG. 15 is a graph illustrating the results of histogram analysis of the image shown in FIG. 14.

FIG. 14 illustrates an image of a third embodiment displayed in the display area DA of the display panel 100. FIG. 15 is a schematic graph illustrating the results of histogram analysis of the image shown in FIG. 14.

Referring to FIGS. 14 and 15, the image analysis part 207 may classify image data of at least one frame into red, green, and blue data and may analyze and display the number of each of the red, green, and blue data and the proportion of each of the red, green, and blue data based on each preset grayscale value using a histogram.

The image analysis part 207 may detect grayscale distribution information of each of the red, green, and blue data for at least one frame or for each preset image display area or image display block. The image analysis part 207 may analyze the number of each of the red, green, and blue data and the proportion of each of the red, green, and blue data based on each preset luminance value using a histogram.

FIGS. 16A to 16C are schematic diagrams illustrating the results of detecting the loads of red, green, and blue pixels of the image shown in FIG. 14 for each preset block area.

Specifically, FIG. 16A is a schematic diagram illustrating the load detection result according to the grayscale value of red image data of each preset block area. FIG. 16B is a schematic diagram illustrating the load detection result according to the grayscale value of green image data of each preset block area. FIG. 16C is a schematic diagram illustrating the load detection result according to the grayscale value of blue image data of each preset block area.

The load detection part 202 may calculate the load using a preset load detection equation or may detect or derive the loads of the red, green, and blue pixels for each block area from a database pre-stored in a memory such as a lookup table using experimental values. The load may be derived as a value that decreases to about 0 toward black and increases to about 10 or about 100 toward white.

FIGS. 17A to 17D are schematic diagrams illustrating the results of calculating the optimal frequencies of the red, green, and blue pixels displaying the image shown in FIG. 14 for each preset block area.

Specifically, FIG. 17A is a schematic diagram illustrating the driving frequency detection result according to the load detection result of the red image data of each preset block area. FIG. 17B is a schematic diagram illustrating the driving frequency detection result according to the load detection result of the green image data of each preset block area. FIG. 17C is a schematic diagram illustrating the driving frequency detection result according to the load detection result of the blue image data of each preset block area. FIG. 17D is a schematic diagram illustrating the result of detecting a driving frequency matched to a load corresponding to a luminance value of each preset block area.

The driving frequency setting part 204 or the block driving frequency setting part 208 may calculate the driving frequency using a preset frequency detection equation or may detect or derive the driving frequencies of the red, green, and blue pixels PX of each block area from a database pre-stored in a memory such as a lookup table using experimental values. The driving frequency may be derived as a value that decreases to about 0.1 Hz toward black and increases to about 60 Hz or about 120 Hz toward white.

Figure 18:
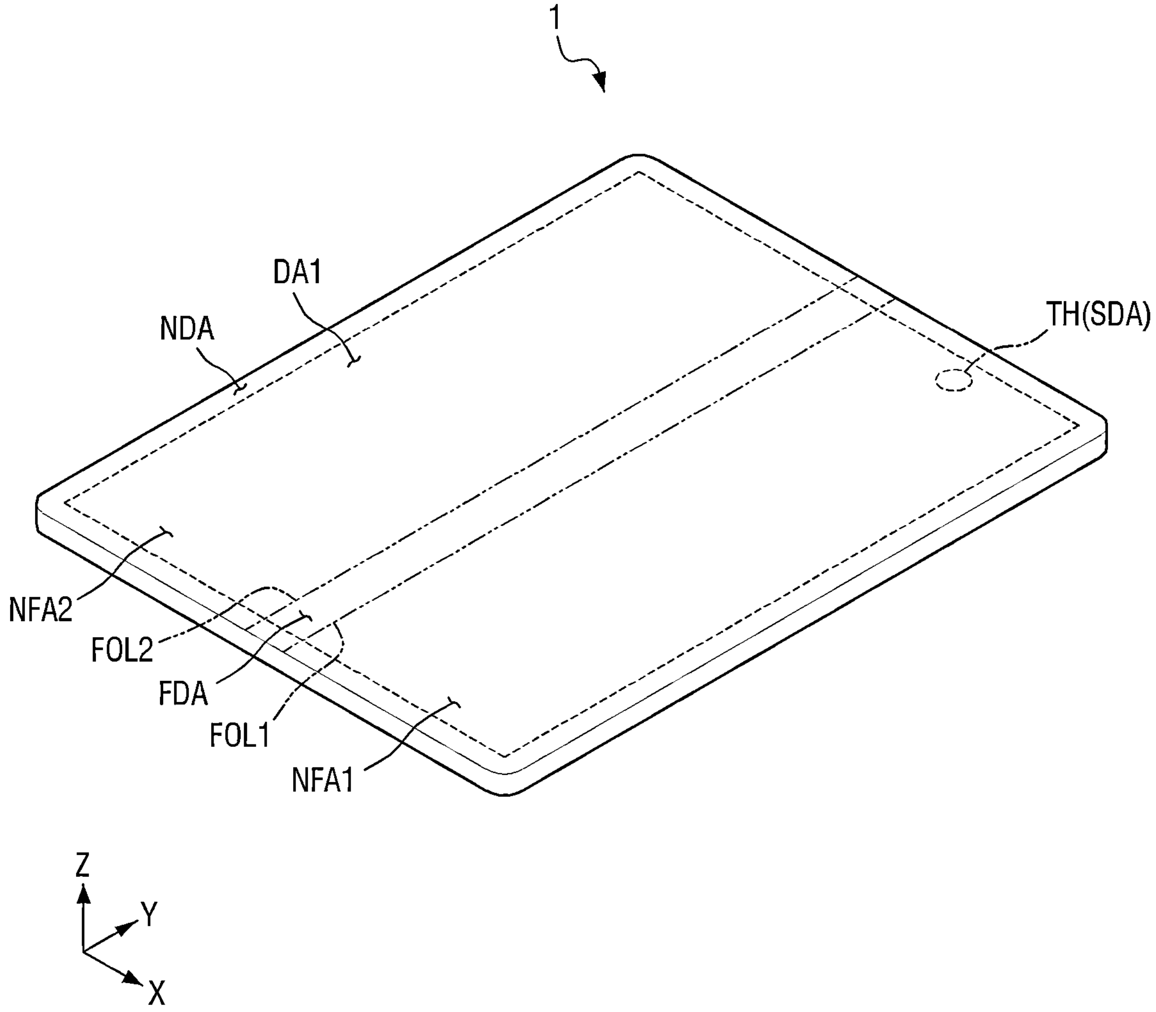
FIGS. 18 and 19 are schematic perspective views of a quantum dot display device including a quantum dot light emitting layer according to an embodiment.
Figure 19:
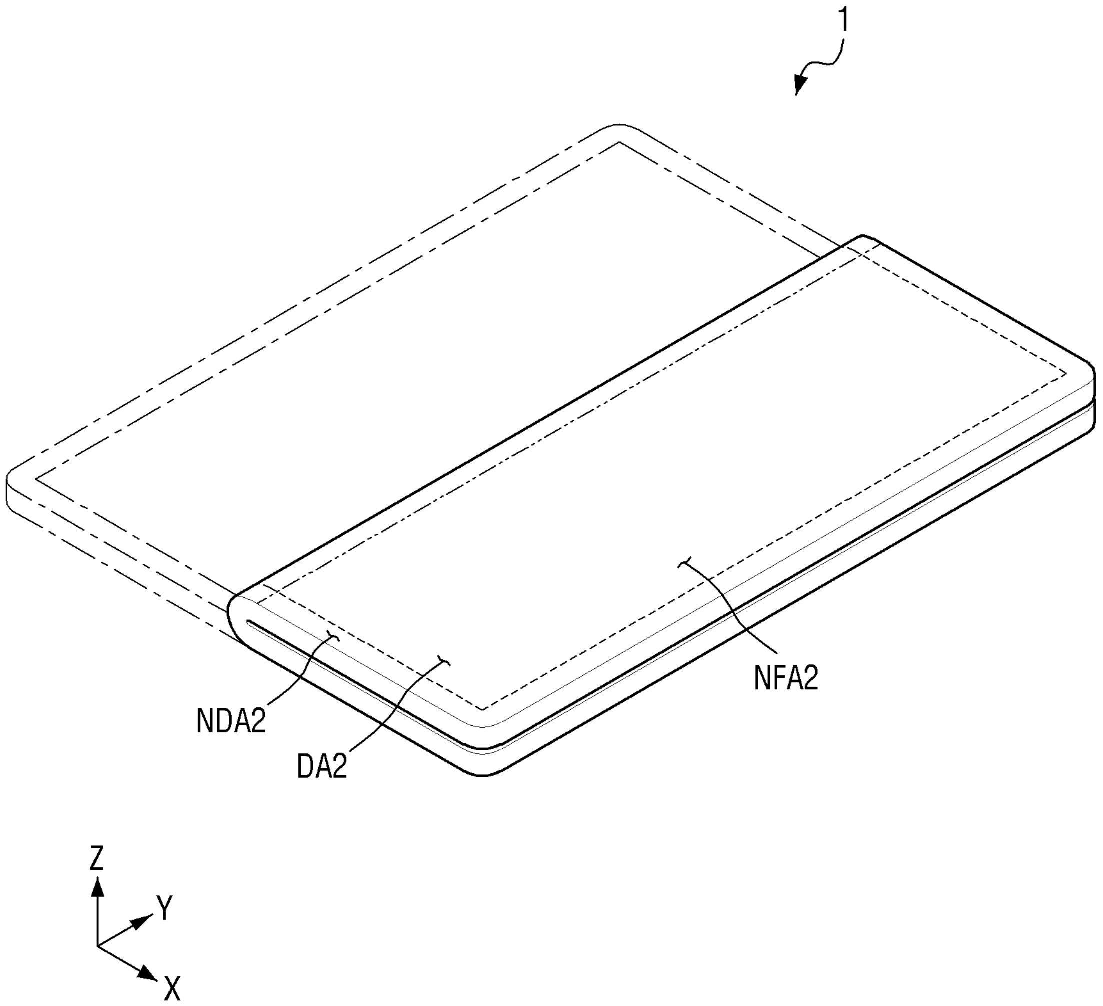

FIGS. 18 and 19 are schematic perspective views of a quantum dot display device 1 including a quantum dot light emitting layer according to an embodiment.

In FIGS. 18 and 19, the display device 1 is illustrated as a foldable quantum dot display device that is folded in the first direction (X-axis direction). The display device 1 can maintain a folded state and an unfolded state. The display device 1 may be folded in an in-folding manner in which a front surface thereof is disposed inside. In case that the display device 1 is bent or folded in the in-folding manner, portions of the front surface of the display device 1 may face each other. As another example, the display device 1 may be folded in an out-folding manner in which the front surface is disposed outside. In case that the display device 1 is bent or folded in the out-folding manner, portions of a back surface of the display device 1 may face each other.

A first non-folding area NFA1 may be disposed on a side, e.g., a right side of a folding area FDA. A second non-folding area NFA2 may be disposed on another side, e.g., a left side of the folding area FDA. A touch sensing part for sensing a touch of a human body or an electronic pen may be formed and disposed on each of the first non-folding area NFA1 and the second non-folding area NFA2.

A first folding line FOL1 and a second folding line FOL2 may extend in the second direction (Y-axis direction), and the display device 1 may be folded in the first direction (X-axis direction). Therefore, since a length of the display device 1 in the first direction (X-axis direction) can be reduced by about half, a user can readily move or carry the display device 1.

The direction in which the first folding line FOL1 and the second folding line FOL2 extend is not limited to the second direction (Y-axis direction). For example, the first folding line FOL1 and the second folding line FOL2 may also extend in the first direction (X-axis direction), and the display device 1 may also be folded in the second direction (Y-axis direction). In this case, a length of the display device 1 in the second direction (Y-axis direction) may be reduced by about half. As another example, the first folding line FOL1 and the second folding line FOL2 may extend in a diagonal direction of the display device 1 between the first direction (X-axis direction) and the second direction (Y-axis direction). In this case, the display device 1 may be folded into a triangular shape.

In case that the first folding line FOL1 and the second folding line FOL2 extend in the second direction (Y-axis direction), a length of the folding area FDA in the first direction (X-axis direction) may be smaller than a length of the folding area FDA in the second direction (Y-axis direction). A length of the first non-folding area NFA1 in the first direction (X-axis direction) may be greater than the length of the folding area FDA in the first direction (X-axis direction). A length of the second non-folding area NFA2 in the first direction (X-axis direction) may be greater than the length of the folding area FDA in the first direction (X-axis direction).

A first display area DA1 may be disposed on the front surface of the display device 1. The first display area DA1 may overlap the folding area FDA, the first non-folding area NFA1, and the second non-folding area NFA2. Therefore, in case that the display device 1 is unfolded, an image may be displayed toward the front surface in the folding area FDA, the first non-folding area NFA1, and the second non-folding area NFA2 of the display device 1.

A second display area DA2 may be disposed on the back surface of the display device 1. The second display area DA2 may overlap the second non-folding area NFA2. Therefore, in case that the display device 1 is folded, an image may be displayed toward the front surface in the second non-folding area NFA2 of the display device 1.

In FIGS. 18 and 19, a through hole TH in which a camera is formed may be disposed in the first non-folding area NFA1, but the disclosure is not limited thereto. The through hole TH or the camera may also be disposed in the second non-folding area NFA2 or the folding area FDA.

Figure 20:
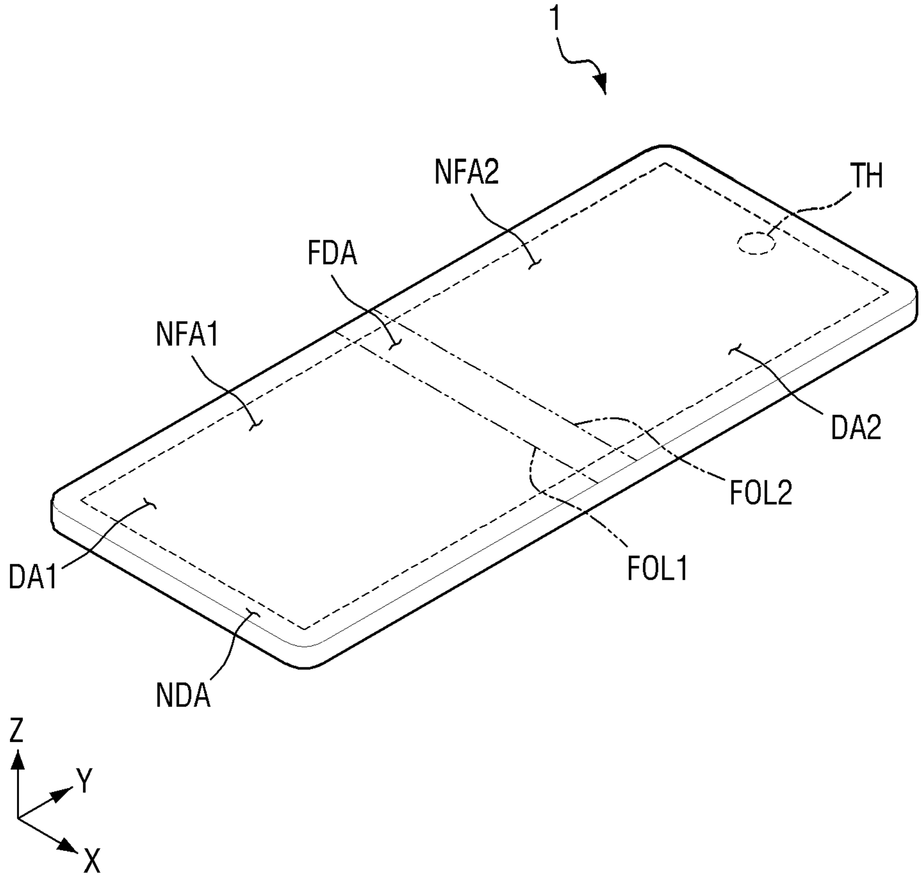
FIGS. 20 and 21 are schematic perspective views of a quantum dot display device according to an embodiment of the disclosure.
Figure 21:
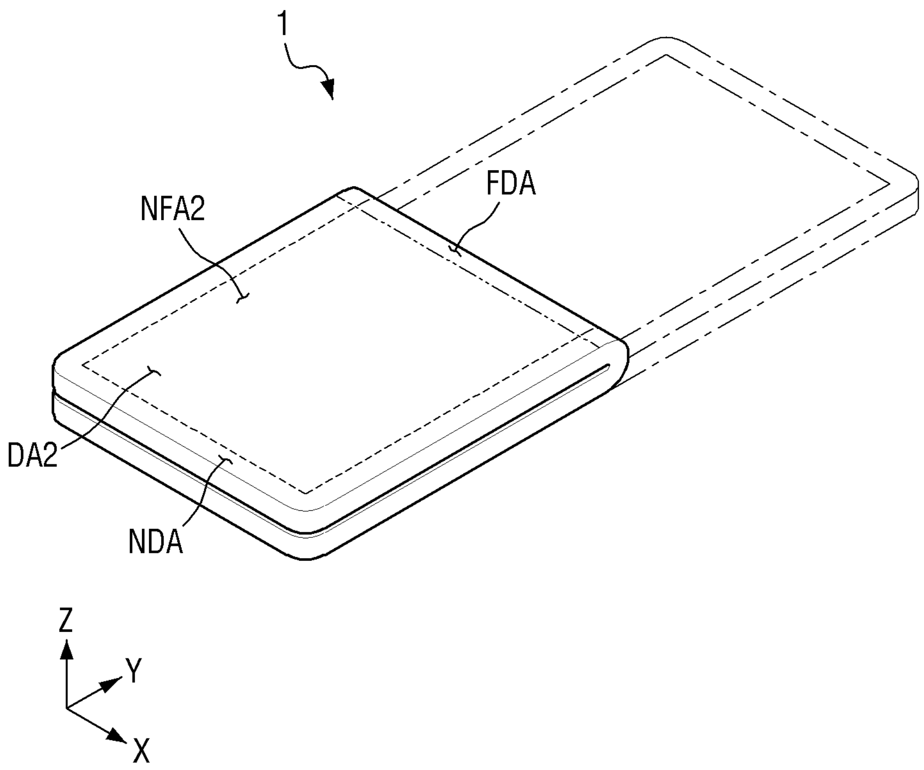

FIGS. 20 and 21 are schematic perspective views of a quantum dot display device 1 according to an embodiment of the disclosure.

In FIGS. 20 and 21, the display device 1 is illustrated as a foldable display device that is folded in the second direction (Y-axis direction). The display device 1 can maintain a folded state or an unfolded state. The display device 1 may be folded in an in-folding manner in which a front surface thereof is disposed inside. In case that the display device 1 is bent or folded in the in-folding manner, portions of the front surface of the display device 1 may face each other. As another example, the display device 1 may be folded in an out-folding manner in which the front surface is disposed outside. In case that the display device 1 is bent or folded in the out-folding manner, portions of a back surface of the display device 1 may face each other.

The display device 1 may include a folding area FDA, a first non-folding area NFA1, and a second non-folding area NFA2. The folding area FDA may be an area where the display device 1 is folded, and the first non-folding area NFA1 and the second non-folding area NFA2 may be areas where the display device 1 is not folded. The first non-folding area NFA1 may be disposed on a side, e.g., a lower side of the folding area FDA. The second non-folding area NFA2 may be disposed on another side, e.g., an upper side of the folding area FDA.

A touch sensing part for sensing a user's touch may be formed and disposed on each of the first non-folding area NFA1 and the second non-folding area NFA2.

The folding area FDA may be an area that is bent with a curvature (e.g., a predetermined or selectable curvature) at a first folding line FOL1 and a second folding line FOL2. Therefore, the first folding line FOL1 may be a boundary between the folding area FDA and the first non-folding area NFA1, and the second folding line FOL2 may be a boundary between the folding area FDA and the second non-folding area NFA2.

The first folding line FOL1 and the second folding line FOL2 may extend in the first direction (X-axis direction) as illustrated in FIGS. 20 and 21, and the display device 1 may be folded in the second direction (Y-axis direction). Therefore, since a length of the display device 1 in the second direction (Y-axis direction) can be reduced by about half, a user can easily carry the display device 1.

The direction in which the first folding line FOL1 and the second folding line FOL2 extend is not limited to the first direction (X-axis direction). For example, the first folding line FOL1 and the second folding line FOL2 may also extend in the second direction (Y-axis direction), and the display device 1 may also be folded in the first direction (X-axis direction). In this case, a length of the display device 1 in the first direction (X-axis direction) may be reduced by about half. As another example, the first folding line FOL1 and the second folding line FOL2 may extend in a diagonal direction of the display device 1 between the first direction (X-axis direction) and the second direction (Y-axis direction). In this case, the display device 1 may be folded into a triangular shape.

In case that the first folding line FOL1 and the second folding line FOL2 extend in the first direction (X-axis direction) as illustrated in FIGS. 20 and 21, a length of the folding area FDA in the second direction (Y-axis direction) may be smaller than a length of the folding area FDA in the first direction (X-axis direction). A length of the first non-folding area NFA1 in the second direction (Y-axis direction) may be greater than the length of the folding area FDA in the second direction (Y-axis direction). A length of the second non-folding area NFA2 in the second direction (Y-axis direction) may be greater than the length of the folding area FDA in the second direction (Y-axis direction).

A first display area DA1 may be disposed on the front surface of the display device 1. The first display area DA1 may overlap the folding area FDA, the first non-folding area NFA1, and the second non-folding area NFA2. Therefore, in case that the display device 1 is unfolded, an image may be displayed toward the front surface in the folding area FDA, the first non-folding area NFA1, and the second non-folding area NFA2 of the display device 1.

A second display area DA2 may be disposed on the back surface of the display device 1. The second display area DA2 may overlap the second non-folding area NFA2. Therefore, in case that the display device 1 is folded, an image may be displayed toward the front surface in the second non-folding area NFA2 of the display device 1.

In FIGS. 20 and 21, a through hole TH in which a camera is formed may be disposed in the second non-folding area NFA2, but the disclosure is not limited thereto. The through hole TH or the camera may also be disposed in the first non-folding area NFA1 or the folding area FDA.

Figure 22:
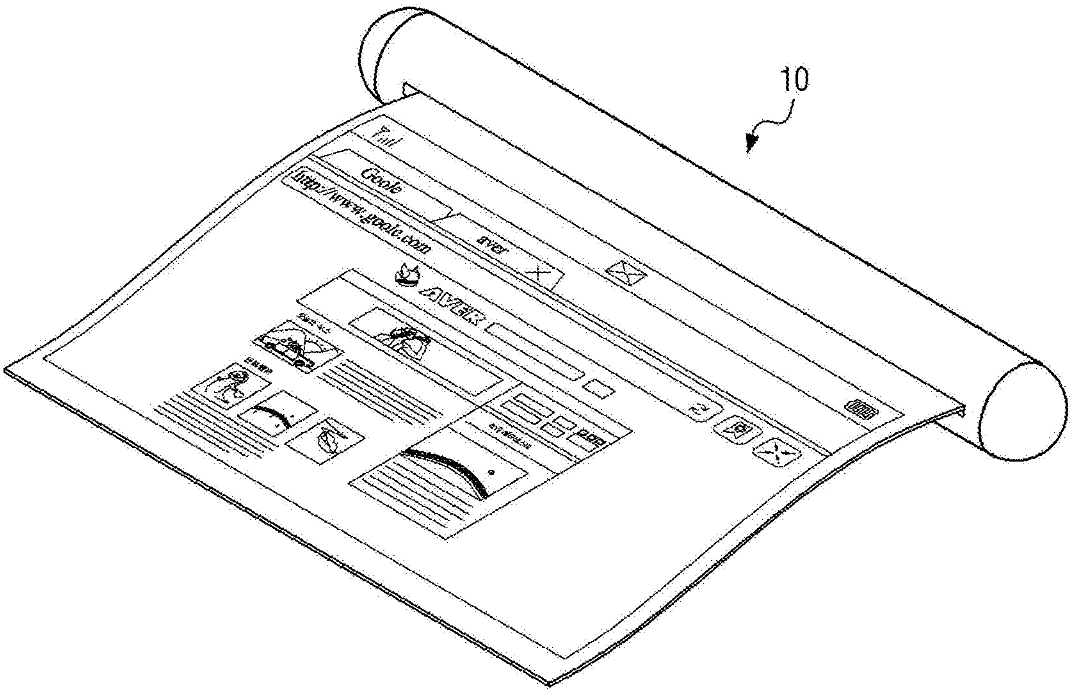
FIG. 22 is a schematic perspective view of a rollable quantum dot display device according to an embodiment of the disclosure.
Figure 23:
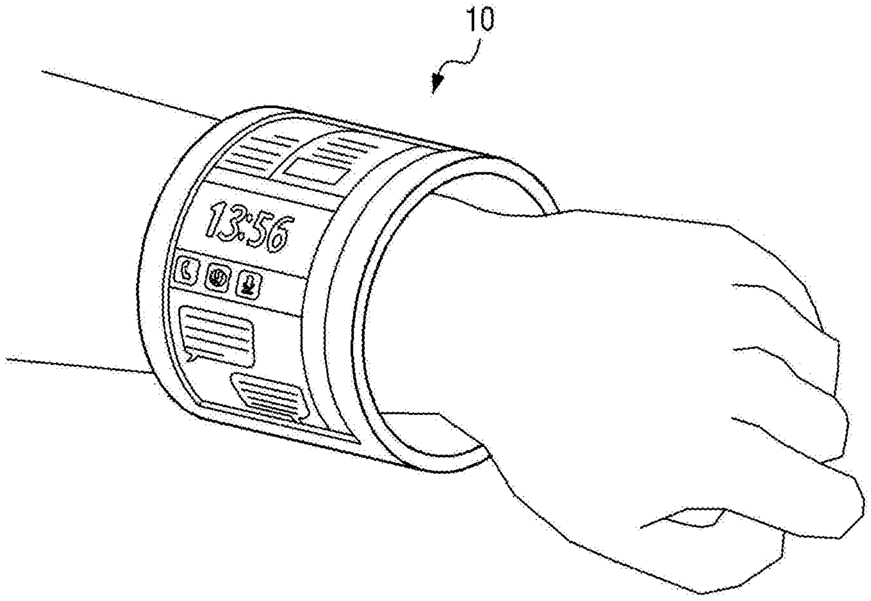
FIG. 23 is a schematic perspective view of a rollable quantum dot display device according to an embodiment of the disclosure.

FIG. 22 is a schematic perspective view of a rollable quantum dot display device 1 according to an embodiment of the disclosure. FIG. 23 is a schematic perspective view of a rollable quantum dot display device 1 according to an embodiment of the disclosure.

Referring to FIGS. 22 and 23, each of the rollable quantum dot display devices 1 may be applied as a display part of a portable electronic device such as a tablet PC, a mobile communication terminal, an electronic notebook, an e-book reader, or an UMPC. A display panel 100 of each of the rollable quantum dot display devices 1 may be bent and rolled in the first direction (X-axis direction) or the second direction (Y-axis direction).

The quantum dot display devices of the above-described embodiments can prevent image display defects (such as luminance reduction and flickering) caused by low-frequency driving, thereby maintaining or improving image display quality even during a period of reducing power consumption.

It is possible to improve power consumption reduction efficiency and product reliability by efficiently adjusting an optimal driving frequency, image display and maintenance period, and high-potential driving voltage level according to the results of analysis of characteristics such as display image grayscale distribution, load for each display area, maximum luminance value, and grayscale value.

The above description is an example of technical features of the disclosure, and those skilled in the art to which the disclosure pertains will be able to make various modifications and variations. Thus, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A display device comprising:

pixels arranged in a display area of a display panel; and a display driver determining whether image data indicates still image characteristics or moving image characteristics and controlling a supply timing of data voltages and pixel driving control signals supplied to the pixels based on a determination result, wherein the display driver selectively adjusts a driving frequency for driving the pixels and a level of a high-potential voltage supplied to the pixels based on a result of grayscale analysis of the image data, and the display driver comprises:

a maximum luminance detection part sorting an image data input from an outside in units of at least one frame and detecting minimum and maximum grayscale values and minimum and maximum luminance values of image data of at least one frame;

a load detection part comparing and analyzing grayscale values or luminance values of the image data of at least one frame and detecting load information of pixels of each preset image display block and load information of all of pixels of at least one frame;

an image analysis part analyzing the grayscale values and the luminance values of the image data of at least one frame using a histogram and detecting grayscale distribution information of each preset image display block and grayscale distribution information of at least one frame; and a driving frequency setting part varying and setting the driving frequency of the pixels of at least one frame in units of at least one frame period according to ranges comprising the minimum and maximum grayscale values and the minimum and maximum luminance values of the image data of at least one frame.

2. The display device of claim 1, wherein the display driver determines whether a still image is displayed according to the result of grayscale analysis of the image data and, in case of determining that the still image is displayed, drives the pixels by lowering the driving frequency of pixels of each preset block or all the pixels and the level of the high-potential voltage supplied to the pixels and increasing an image display period during which the data voltages are supplied to the pixels according to the result of grayscale analysis of the image data.

3. The display device of claim 1, wherein the display driver determines whether a moving image is displayed according to the result of grayscale analysis of the image data and, in case of determining that the moving image is displayed, drives the pixels by increasing the driving frequency of the pixels of each preset block or all the pixels and the level of the high-potential voltage supplied to the pixels and reducing an image display period during which the data voltages are supplied to the pixels according to the result of grayscale analysis of the image data.

4. The display device of claim 1, wherein the display driver further comprises a load scale setting part analyzing a grayscale display range and a luminance display range of image data of each preset image display block or at least one frame according to the ranges comprising the minimum and maximum grayscale values and the minimum and maximum luminance values of the image data of at least one frame, and the driving frequency setting part varies and sets the driving frequency of the pixels of at least one frame in units of at least one frame period according to the grayscale display range and the luminance display range of the image data of each preset image display block or at least one frame.

5. The display device of claim 1, wherein the display driver further comprises:

a block driving frequency setting part varying and setting the driving frequency of the pixels of each preset image display block in units of at least one frame period according to the grayscale distribution information of each preset image display block and the grayscale distribution information of at least one frame;

a driving voltage setting part varying and setting the level of the high-potential voltage supplied to the pixels in units of at least one frame period according to the ranges comprising the minimum and maximum grayscale values and the minimum and maximum luminance values of the image data of at least one frame;

an image display period setting part varying and setting a supply period of an image data voltage supplied to the pixels of at least one frame in response to a change in the driving frequency of the pixels of at least one frame which is varied and set in units of at least one frame period; and a panel driving control part varying a supply timing and a supply period of the pixel driving control signals and the data voltages supplied to the pixels in response to a change in the driving frequency which is varied and set in units of at least one frame period.

6. The display device of claim 5, wherein the driving voltage setting part varies and sets the level of the high-potential voltage supplied to the pixels of each preset image display block according to ranges comprising minimum and maximum grayscale values and minimum and maximum luminance values of the image data of each preset image display block.

7. The display device of claim 5, wherein the image display period setting part varies and sets the supply period of an image data voltage supplied to the pixels of each preset image display block in units of a preset image display block in response to a change in the driving frequency of the pixels of each preset image display block which is varied and set in units of at least one frame period.

8. The display device of claim 5, wherein the panel driving control part varies the supply timing and the supply period of the pixel driving control signals and the data voltages sequentially supplied to the pixels of each preset image display block in response to a change in the driving frequency of the pixels of each preset image display block which is varied and set in units of at least one frame period.

9. The display device of claim 5, wherein the panel driving control part varies the level of the high-potential voltage supplied to the pixels in units of at least one frame period in response to high-potential voltage level information of the pixels of at least one frame which is varied and set in units of at least one frame period or varies the level of the high-potential voltage supplied to the pixels of each preset image display block in units of at least one frame period in response to high-potential voltage level information of the pixels of each preset image display block which is varied and set in units of at least one frame period.

10. The display device of claim 5, wherein the panel driving control part sequentially supplies a data voltage to the pixels in units of at least one horizontal line in response to an image data voltage supply period of the pixels of at least one frame which is varied and set in units of at least one frame period or sequentially supplies a data voltage to the pixels in units of at least one horizontal line in response to the image data voltage supply period of the pixels of each preset image display block which is varied and set in units of at least one frame period.

11. A display device comprising:

pixels arranged in a display area of a display panel; and a display driver determining whether image data indicates still image characteristics or moving image characteristics and controlling a supply timing of data voltages and pixel driving control signals supplied to the pixels based on a determination result, wherein the display driver determines whether a still image is displayed based on a result of grayscale analysis of the image data and, in case of determining that the still image is displayed, drives the pixels by lowering a driving frequency of pixels of each preset block or all the pixels and a level of a high-potential voltage supplied to the pixels and increasing an image display period during which the data voltages are supplied to the pixels according to the result of grayscale analysis of the image data, and the display driver comprises:

a maximum luminance detection part sorting an image data input from an outside in units of at least one frame and detecting minimum and maximum grayscale values and minimum and maximum luminance values of image data of at least one frame;

a load detection part comparing and analyzing grayscale values or luminance values of the image data of at least one frame and detecting load information of pixels of each preset image display block and load information of all of pixels of at least one frame;

an image analysis part analyzing the grayscale values and the luminance values of the image data of at least one frame using a histogram and detecting grayscale distribution information of each preset image display block and grayscale distribution information of at least one frame; and a driving frequency setting part varying and setting the driving frequency of the pixels of at least one frame in units of at least one frame period according to ranges comprising the minimum and maximum grayscale values and the minimum and maximum luminance values of the image data of at least one frame.

12. The display device of claim 11, wherein the display driver further comprises a load scale setting part analyzing a grayscale display range and a luminance display range of image data of each preset image display block or at least one frame according to the ranges comprising the minimum and maximum grayscale values and the minimum and maximum luminance values of the image data of at least one frame, and the driving frequency setting part varies and sets the driving frequency of the pixels of at least one frame in units of at least one frame period according to the grayscale display range and the luminance display range of the image data of each preset image display block or at least one frame.

13. The display device of claim 11, wherein the display driver further comprises:

a block driving frequency setting part varying and setting the driving frequency of the pixels of each preset image display block in units of at least one frame period according to the grayscale distribution information of each preset image display block and the grayscale distribution information of at least one frame;

a driving voltage setting part varying and setting the level of the high-potential voltage supplied to the pixels in units of at least one frame period according to the ranges comprising the minimum and maximum grayscale values and the minimum and maximum luminance values of the image data of each preset image display block or at least one frame;

an image display period setting part varying and setting a supply period of an image data voltage supplied to the pixels of at least one frame in response to a change in the driving frequency of the pixels of at least one frame which is varied and set in units of at least one frame period; and a panel driving control part varying the supply timing and a supply period of the pixel driving control signals and the data voltages supplied to the pixels in response to a change in the driving frequency which is varied and set in units of at least one frame period.

14. The display device of claim 13, wherein the image display period setting part varies and sets the supply period of an image data voltage supplied to the pixels of each preset image display block in units of a preset image display block in response to a change in the driving frequency of the pixels of each preset image display block which is varied and set in units of at least one frame period.

15. The display device of claim 13, wherein the panel driving control part varies the supply timing and the supply period of the pixel driving control signals and the data voltages sequentially supplied to the pixels of each preset image display block in response to a change in the driving frequency of the pixels of each preset image display block which is varied and set in units of at least one frame period.

16. The display device of claim 13, wherein the panel driving control part varies the level of the high-potential voltage supplied to the pixels in units of at least one frame period in response to high-potential voltage level information of the pixels of at least one frame which is varied and set in units of at least one frame period or varies the level of the high-potential voltage supplied to the pixels of each preset image display block in units of at least one frame period in response to high-potential voltage level information of the pixels of each preset image display block which is varied and set in units of at least one frame period.

17. The display device of claim 13, wherein the panel driving control part sequentially supplies a data voltage to the pixels in units of at least one horizontal line in response to an image data voltage supply period of the pixels of at least one frame which is varied and set in units of at least one frame period or sequentially supplies a data voltage to the pixels in units of at least one horizontal line in response to the image data voltage supply period of the pixels of each preset image display block which is varied and set in units of at least one frame period.

18. An electronic device including a display device, wherein the display device comprises:

pixels arranged in a display area of a display panel; and a display driver determining whether image data indicates still image characteristics or moving image characteristics and controlling a supply timing of data voltages and pixel driving control signals supplied to the pixels based on a determination result, wherein the display driver selectively adjusts a driving frequency for driving the pixels and a level of a high-potential voltage supplied to the pixels based on a result of grayscale analysis of the image data, wherein the display driver comprises:

a maximum luminance detection part sorting an image data input from an outside in units of at least one frame and detecting minimum and maximum grayscale values and minimum and maximum luminance values of image data of at least one frame;

a load detection part comparing and analyzing grayscale values or luminance values of the image data of at least one frame and detecting load information of pixels of each preset image display block and load information of all of pixels of at least one frame;

an image analysis part analyzing the grayscale values and the luminance values of the image data of at least one frame using a histogram and detecting grayscale distribution information of each preset image display block and grayscale distribution information of at least one frame; and a driving frequency setting part varying and setting the driving frequency of the pixels of at least one frame in units of at least one frame period according to ranges comprising the minimum and maximum grayscale values and the minimum and maximum luminance values of the image data of at least one frame.

* * * * *